United States Patent
Jung et al.

(10) Patent No.: US 9,585,214 B2
(45) Date of Patent: Feb. 28, 2017

(54) LED DRIVING CIRCUIT FOR CONTINUOUSLY DRIVING LED, LED LIGHTING DEVICE COMPRISING SAME AND DRIVING METHOD

(71) Applicant: Seoul Semiconductor Co., Ltd., Ansan-si (KR)

(72) Inventors: Hye Man Jung, Ansan-si (KR); Hyun Gu Kang, Ansan-si (KR); Sang Wook Han, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 14/753,612

(22) Filed: Jun. 29, 2015

(65) Prior Publication Data
US 2015/0305098 A1    Oct. 22, 2015

Related U.S. Application Data

(63) Continuation of application No. PCT/KR2013/012248, filed on Dec. 27, 2013.

(30) Foreign Application Priority Data

Dec. 28, 2012 (KR) .......................... 10-2012-0157223
Dec. 28, 2012 (KR) .......................... 10-2012-0157224

(51) Int. Cl.
    *H05B 33/08* (2006.01)
(52) U.S. Cl.
    CPC ......... *H05B 33/083* (2013.01); *H05B 33/089* (2013.01); *H05B 33/0824* (2013.01); *H05B 33/0842* (2013.01)
(58) Field of Classification Search
    CPC .. H05B 33/0815; H05B 33/083; H05B 37/02; H05B 33/08; H05B 33/0824;
    (Continued)

(56) References Cited

U.S. PATENT DOCUMENTS

| 8,384,311 B2 * | 2/2013 | Gray | H05B 33/0824 315/185 R |
| 9,035,567 B2 * | 5/2015 | Sakuragi | H05B 33/083 315/185 S |

(Continued)

FOREIGN PATENT DOCUMENTS

| KR | 10-2010-0107196 | 10/2010 |
| KR | 10-2012-0008004 | 1/2012 |

(Continued)

OTHER PUBLICATIONS

International Search Report mailed on Mar. 26, 2014, in International Application No. PCT/KR2013/012248.

*Primary Examiner* — Douglas W Owens
*Assistant Examiner* — Wei Chan
(74) *Attorney, Agent, or Firm* — H.C. Park & Associates, PLC

(57) ABSTRACT

An exemplary embodiment discloses a light-emitting diode (LED) driving circuit including an LED driving module configured to provide a first driving voltage to an LED light emitting module including a first LED group to an n-th LED group, n is an integer which is equal to or larger than 2, and sequentially drive the first LED group to the n-th LED group depending on a voltage level of the first driving voltage and a second driving voltage providing module configured to store some of the first driving voltage and selectively provide a second driving voltage to some of the LED groups other than at least the first LED group to an m-th LED group among the LED groups in a $V_{fm}$ compensation section, $1 \leq m \leq n-1$, according to a control of the LED driving module.

14 Claims, 9 Drawing Sheets

(58) Field of Classification Search
CPC ............ H05B 33/0845; H05B 33/0851; H05B 33/0827; H05B 33/0848; H02M 3/33507; H02M 1/4225; H02M 3/33523; H02M 3/33561
USPC ............. 315/185 R, 291, 294, 299, 307, 308
See application file for complete search history.

(56) References Cited

U.S. PATENT DOCUMENTS

| | | |
|---|---|---|
| 2012/0306392 A1 | 12/2012 | Young et al. |
| 2015/0245427 A1* | 8/2015 | Jung .................. H05B 33/0824 315/193 |

FOREIGN PATENT DOCUMENTS

| | | |
|---|---|---|
| KR | 10-2012-0032509 | 4/2012 |
| KR | 10-2012-0041093 | 4/2012 |
| KR | 10-2012-0074502 | 7/2012 |
| KR | 10-2012-0123175 | 11/2012 |
| WO | 2012-096455 | 7/2012 |

* cited by examiner

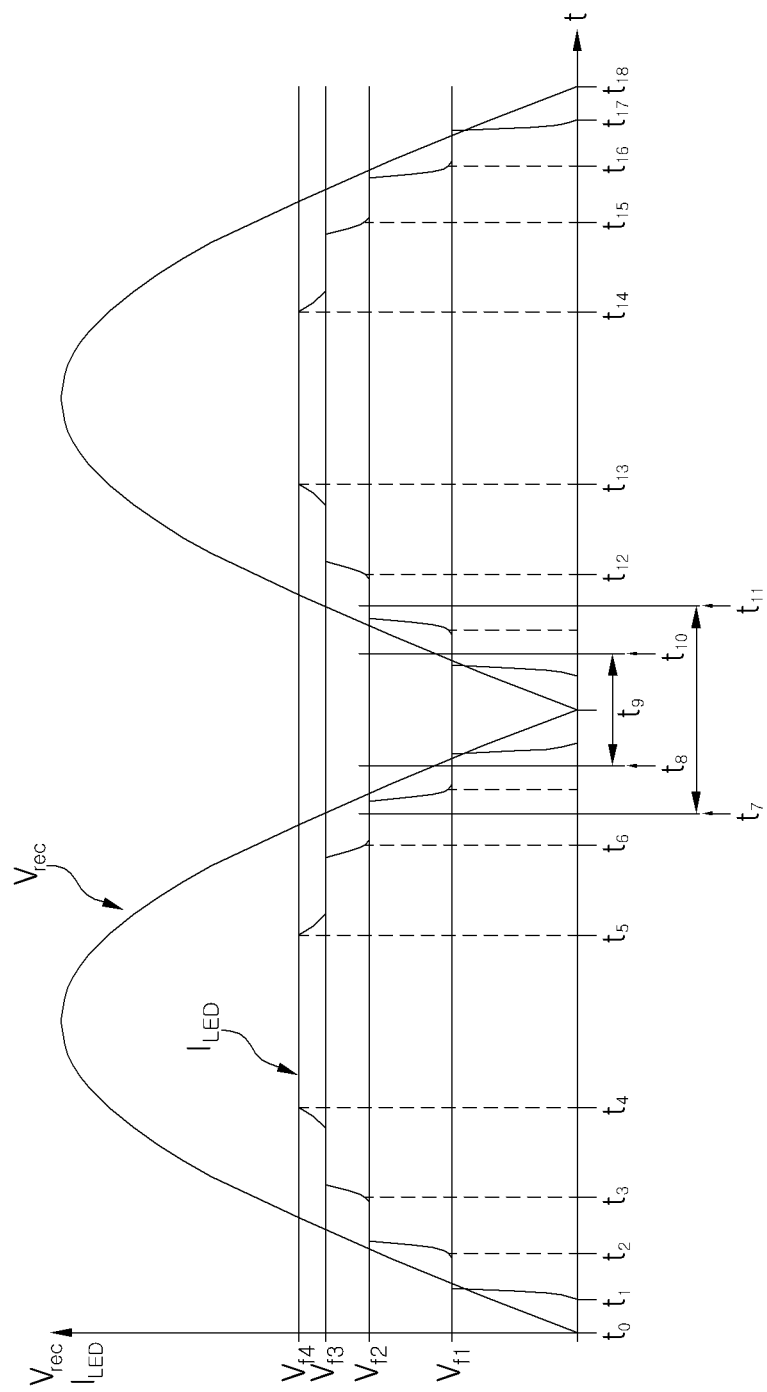

LED DRIVING CIRCUIT FOR CONTINUOUSLY DRIVING LED, LED LIGHTING DEVICE COMPRISING SAME AND DRIVING METHOD

CROSS-REFERENCE TO RELATED APPLICATIONS

This application is a continuation of International Application PCT/KR2013/012248, filed on Dec. 27, 2013, and claims priority from and the benefit of Korean Patent Application No. 10-2012-0157223, filed on Dec. 28, 2012 and Korean Patent Application No. 10-2012-0157224, filed on Dec. 28, 2012, which are incorporated by reference for all purposes as if fully set forth herein.

BACKGROUND

Field

Exemplary embodiments relate to an LED driving circuit for continuously driving an LED, an LED lighting device including the same, and a driving method. More particularly, exemplary embodiments relate to an LED driving circuit for continuously driving an LED capable of compensating for an optical output of LED lighting using an energy chargeable/dischargeable element and/or circuit, an LED lighting device including the same, and a driving method.

Discussion of the Background

LED driving is generally based on a DC driving type. The DC driving type has to include an AC-DC converter such as an SMPS. The power converter causes problems of increasing manufacturing costs of lighting fittings, making it difficult to miniaturizing the lighting fittings, reducing energy efficiency of the lighting fittings, and shortening a life of the lighting fittings due to a short life of the power converter.

To solve the problems of the foregoing DC driving type, an AC driving type for an LED has been proposed. However, in the case of a circuit based on the technology, a power factor may be reduced due to a mismatch between an input voltage and a current output from the LED and a flicker phenomenon that a user recognizes flickering of lighting due to a long non-emission section of the LED may occur.

To solve the problems of the foregoing AC driving type for an LED, a sequential driving type for an AC LED has been proposed. According to the sequential driving type for an AC LED, under the situation that the input voltage is increased over time, a first LED first starts to emit light at $V_{f1}$, a second LED is connected to the first LED in series to start to emit light at $V_{f2}$ which is a voltage higher than the $V_{f1}$, and a third LED is connected to the second LED and the first LED in series to start to emit light at $V_{f3}$ which is a voltage higher than the $V_{f2}$. In addition, under the situation that the input voltage is decreased over time, the third LED first stops emitting the light at the $V_{f3}$, the second LED stops emitting light at the $V_{f2}$, and the first LED finally stops emitting light at the $V_{f1}$, such that an LED driving current is designed to be approximate to the input voltage. According to the AC LED sequential driving type, the LED driving current is converged like an AC input voltage, and as a result a power factor may be improved. However, the flicker phenomenon still occurs in the non-emission section in which the input voltage does not reach the $V_{f1}$ and a light emitting time for each LED light emitting module is different to make optical characteristics of the lighting fittings non-uniform.

Meanwhile, to solve the problem of the AC LED sequential driving type as described above, various technologies to remove a non-emission section using a smoothing capacitor, a power factor correction circuit, etc., have been proposed. However, according to the foregoing technologies, a total harmonic distortion (THD) may be rather worse due to device characteristics in which a current is suddenly increased at timing when the smoothing capacitor starts to perform the charging. Further, since the smoothing capacitor needs to maintain a voltage which is equal to or more than at least $V_{f3}$ in order to drive all the LEDs in the non-emission section, the smoothing capacitor requires high capacitance. As a result, the smoothing capacitor is expensive and it is difficult to miniaturize the LED lighting fitting.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an LED driving circuit capable of effectively removing a flicker phenomenon by removing a non-emission section, an LED lighting device including the same, and a driving method.

Exemplary embodiments provide an LED driving circuit capable of reducing required energy storage capacity of an energy charging/discharging device or a circuit, saving manufacturing costs, and miniaturizing LED lighting fittings by not connecting the energy charging/discharging device (or circuit) for providing a second driving voltage to all the LED groups but connecting the energy charging/discharging device to an intermediate node of the LED groups connected in series, an LED lighting device including the same, and a driving method.

Exemplary embodiments provide an LED driving circuit capable of charging an energy charging/discharging device (or circuit) in a relatively longer section than the related art of connecting a smoothing capacitor to all the LED groups by not connecting an energy charging/discharging device (or circuit) for providing a second driving voltage to all the LED groups but connecting the energy charging/discharging device to an intermediate node of the LED groups connected in series.

Exemplary embodiments prevent some of LED groups from deteriorating by turning off the LED groups of a front stage having a relatively longer emission section in a non-emission section and selectively driving the LED groups of a latter stage having a relatively shorter emission section to improve uniformity of a light emitting time among the plurality of LED groups.

Exemplary embodiments provide an LED driving circuit capable of monitoring a voltage applied to an LED group(s) and accurately controlling a turn on/off timing of an energy charging/discharging device (or circuit) based on the monitored results, an LED lighting device including the same, and a driving method.

Exemplary embodiments provide an LED driving circuit capable of monitoring a driving current driving an LED group(s) and accurately controlling a turn on/off timing of an energy charging/discharging device (or circuit) based on the monitored results, an LED lighting device including the same, and a driving method.

Additional aspects will be set forth in the detailed description which follows, and, in part, will be apparent from the disclosure, or may be learned by practice of the inventive concept.

An exemplary embodiment discloses a light-emitting diode (LED) driving circuit including an LED driving module configured to provide a first driving voltage to an LED light emitting module including a first LED group to an n-th LED group, n is an integer which is equal to or larger than 2, and sequentially drive the first LED group to the n-th LED group depending on a voltage level of the first driving voltage and a second driving voltage providing module configured to store some of the first driving voltage and selectively provide a second driving voltage to some of the LED groups other than at least the first LED group to an m-th LED group among the LED groups in a $V_{fm}$ compensation section, $1 \leq m \leq n-1$, according to a control of the LED driving module. The LED driving module is configured to detect an operating state of the m-th LED group and when the m-th LED group is not normally operated, determine that the m-th LED group enters the $V_{fm}$ compensation section, and determine that the m-th LED group is separated from the $V_{fm}$ compensation section when the m-th LED group is normally operated again The first driving voltage has a voltage value that changes over time with a minimum voltage value that is less than or equal to $V_{f1}$ and a maximum voltage value that is greater than or equal to $V_{fm}$.

The first driving voltage is a full-wave-rectified alternating voltage. The LED light emitting module includes a k-th node between a cathode terminal of a k-th LED group and an anode terminal of a k+1-th LED group, $1 \leq k \leq n-1$, $m \leq k$. The second driving voltage providing module is configured to include an energy charging/discharging unit connected to the k-th node to selectively provide the second driving voltage to the k+1-th LED group to the n-th LED group other than the first LED group to the k-th LED group among the LED groups in the $V_{fm}$ compensation section.

The LED driving module is configured to detect a voltage across the m-th LED group and compares the detected voltage of the m-th LED group with a preset reference voltage to determine the operating state of the m-th LED group.

The LED driving module is configured to detect a driving current of the m-th LED group and compare the detected driving current with a preset reference current to determine the operating state of the m-th LED group.

The LED driving module is configured to control the first LED group to the m-th LED group so as not to drive the first LED group to the m-th LED group in the $V_{fm}$ compensation section when the $V_{fm}$ is equal to or greater than $V_{f2}$.

The LED driving module is configured to control the first LED group to the m-th LED group so as to sequentially drive the first LED group to the m-th LED group depending on the voltage level of the first driving voltage applied to the first LED group to the m-th LED group in the $V_{fm}$ compensation section, when the $V_{fm}$ is equal to or greater than $V_{f2}$.

The LED light emitting module further comprises a current cut-off unit configured to be disposed between the k-th node and a cathode of the k-th LED group to cut-off a current by the second driving voltage from being input to the k-th LED group.

The second driving voltage providing module is connected to a second node of the LED light emitting module and is configured to selectively provide the second driving voltage to the third LED group to the n-th LED group other than the first LED group and the second LED group among the LED groups in a $V_{f2}$ compensation section.

The LED driving module is configured to drive the first LED group with the first driving voltage depending on the voltage level of the first driving voltage in the $V_{f2}$ compensation section and drive at least one of the third LED group to the n-th LED group using the second driving voltage.

The second driving voltage providing module is connected to a second node of the LED light emitting module and configured to selectively provide the second driving voltage to the third LED group to the n-th LED group other than the first LED group and the second LED group among the LED groups in a $V_{f1}$ compensation section.

The second driving voltage providing module further includes a charging current controller configured to limit a charging current input to the second driving voltage providing module to a preset constant current value when storing some of the first driving voltage.

The second driving voltage providing module further includes a switching unit configured to control an electrical connection between the energy charging/discharging unit and the k-th node. The energy charging/discharging unit is configured to enter a charging mode to be charged with the first driving voltage when the switching unit is in a turn-off state and enter a discharging mode to be discharged when the switching unit is in a turn-on state to provide the second driving voltage to the LED light emitting module.

An exemplary embodiment also discloses a method of driving a light-emitting diode (LED) device sequentially driving an LED light emitting module including a first LED group to an n-th LED group (n is an integer which is equal to or larger than 2) using a first driving voltage of which the voltage value is changed over time, the driving method including detecting an operating state of an m-th LED group ($1 \leq m \leq n-1$), sequentially driving the first LED group to the n-th LED group depending on a voltage level of the first driving voltage when the m-th LED group is normally operated and storing some of the first driving voltage in a second driving voltage providing module, and determining that the m-th LED group is in a $V_{fm}$ compensation section and selectively providing a second driving voltage output from the second driving voltage providing module to some of the LED groups other than the first LED group to the m-th LED group among the LED groups, when the m-th LED group is not normally operated.

The first driving voltage is a full-wave-rectified alternating voltage. The LED light emitting module includes a k-th node between a cathode terminal of a k-th LED group and an anode terminal of a k+1-th LED group ($1 \leq k \leq n-1$, $m \leq k$). The second driving voltage providing module includes an energy charging/discharging unit connected to the k-th node to selectively provide the second driving voltage to the k+1-th LED group to the n-th LED group other than the first LED group to the k-th LED group among the LED groups in the $V_{fm}$ compensation section.

According to the exemplary embodiments, it is possible to remove the flicker phenomenon by removing the non-emission section.

Further, according to the exemplary embodiments, since the energy charging/discharging device (or circuit) maintains the voltage, which is not the Vfn but is equal or more than '$V_{fn}-V_{fk}$' having a smaller size than that, in the non-emission section by not connecting the energy charging/discharging device (or circuit) for providing the second driving voltage to all the LED groups but connecting the energy charging/discharging device to the intermediate node of the LED groups connected in series, the relatively lower energy storage capacity is required, thereby reducing the increasing factors in manufacturing costs due to the energy charging/discharging device (or circuit) and implementing the miniaturization of the LED lighting fittings.

In addition, according to the exemplary embodiments, the related art of connecting all the LED groups to the smoothing capacitor may perform the charging only in the relatively short section in which the voltage is equal to or more than the $V_{fn}$ (voltage at which the final LED group emits light) which is the relatively higher voltage value, while the exemplary embodiments of connecting the intermediate node of the LED groups to the energy charging/discharging device (or circuit) may perform the charging in the relatively longer section in which the voltage is equal to or more than the '$V_{fn}-V_{fk}$' which is the relatively lower voltage value, thereby allowing the energy charging/discharging device (or circuit) to charge more charges.

Also, according to the exemplary embodiments, it is possible to monitor the voltage applied to the LED group(s) and accurately control the turn on/off timing of the energy charging/discharging device (or circuit) based on the monitored results.

Moreover, according to the exemplary embodiments, it is possible to monitor the driving current driving the LED group(s) and accurately control the turn on/off timing of the energy charging/discharging device (or circuit) based on the monitored results.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 4 is a waveform diagram for describing a compensation section of a four-stage sequential driving LED lighting device.

DETAILED DESCRIPTION OF THE ILLUSTRATED EMBODIMENTS

Figure 1:
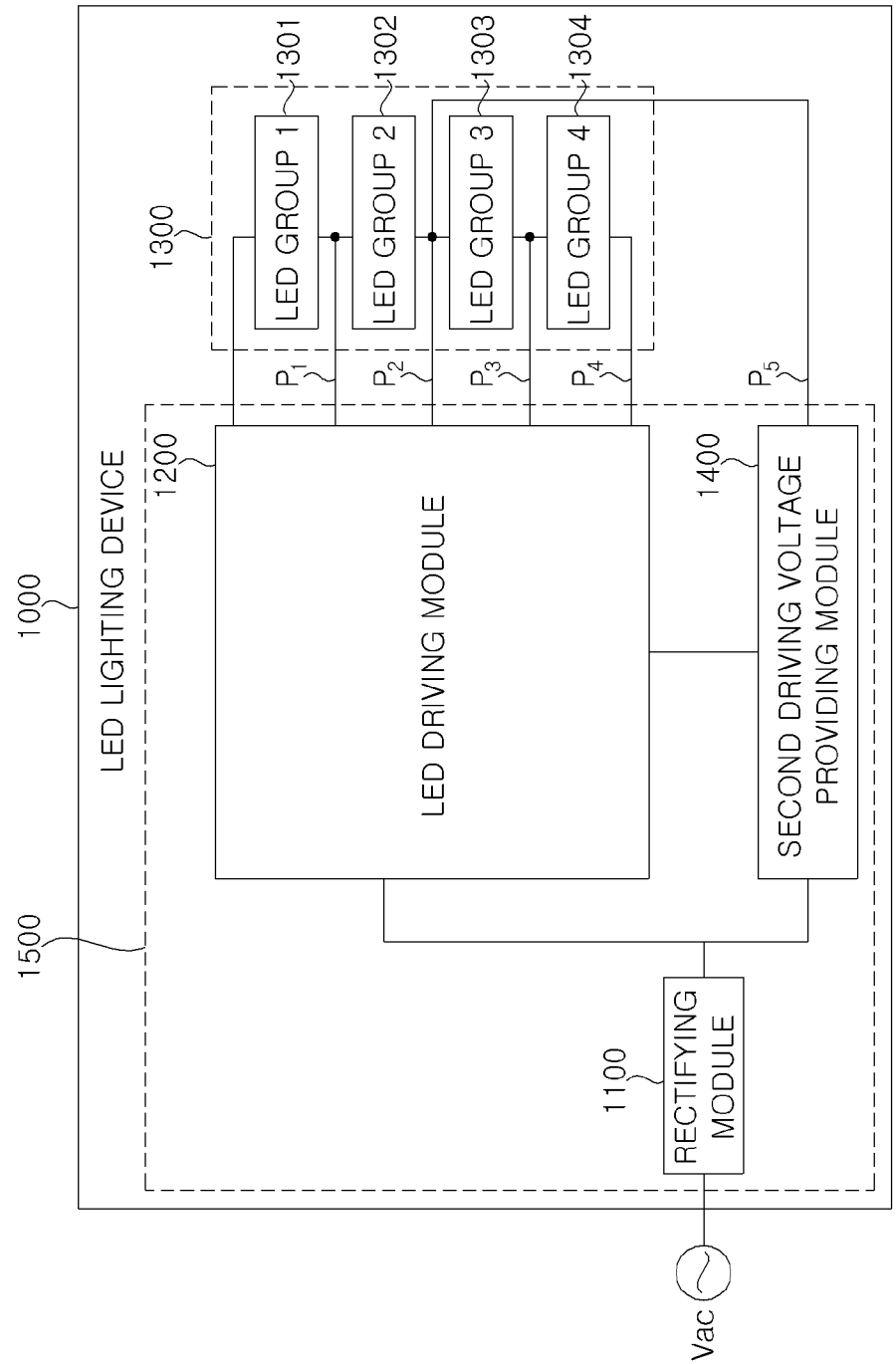
FIG. 1 is a schematic configuration block diagram of an LED lighting device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

In exemplary embodiments, the term "LED group" means a set of LEDs in which a plurality of LEDs (or a plurality of light emitting cells) are connected in series/parallel/series and parallel and thus an operation of the plurality of LEDs is controlled (i.e., turned on/off together) in one unit according to a control of an LED driving module.

Further, the term "first forward voltage level $V_{f1}$" means a threshold voltage level that may drive a first LED group, the term "second forward voltage level $V_{f2}$" means a threshold voltage level that may drive first and second LED groups connected in series, and a term "third forward voltage level $V_{f3}$" means a threshold voltage level that may drive first to third LED groups connected in series. The term "an n-th forward voltage level $V_{fn}$" means a threshold voltage level that may drive first to n-th LED groups connected in series.

In addition, the term "LED driving module" means a module receiving an alternating current (AC) voltage to drive and control LEDs. Although an embodiment in which the driving of the LEDs is controlled using a rectifying voltage will be mainly described, envisioned exemplary embodiments are not limited thereto, but should be generally and widely interpreted.

Further, a term "sequential driving scheme" means a driving scheme by which a plurality of LED groups sequentially emit light with an increase in an applied input voltage and are sequentially turned off with a decrease in an applied input voltage. The LED driving module receiving an input voltage that changes magnitude over time to drive the LEDs.

Further, the term "first driving voltage" means a driving voltage primarily supplied to LED groups by processing (e.g., processing based on a process performed by a rectifying circuit) an input voltage itself or constantly processing the input voltage.

Further, the term "second driving voltage" means a driving voltage secondarily supplied from an energy storage device to LED groups after an input voltage is stored in the energy storage device. The second driving voltage may be, for example, a driving voltage supplied from a charged capacitor to the LED groups after the input voltage is stored in the capacitor.

Further, the term "compensation section" means a section in which a driving current is not supplied to an LED group as a section in which a voltage level of an input voltage (rectifying voltage) is below a preset forward voltage level in the sequential driving scheme. For example, a compensation section of the first forward voltage level $V_{f1}$ means a section in which the voltage level of the rectifying voltage is below the $V_{f1}$ and a compensation section of the second forward voltage level $V_{f2}$ means a section in which the voltage level of the rectifying voltage is below the $V_{f2}$. Therefore, a compensation section of the n-th forward voltage level $V_{fn}$ means a section in which the voltage level of the rectifying voltage is below the $V_{fn}$. Further, the term "compensation of the first forward voltage level $V_{f1}$" means supplying a second driving voltage to an LED group in the compensation section of the first forward voltage level $V_{f1}$ to supply a driving current to the LED group. The term "compensation of the second forward voltage level $V_{f2}$" means supplying a second driving voltage to the LED group in the compensation section of the second forward voltage level $V_{f2}$. Therefore, the compensation of the n-th forward voltage level $V_{fn}$ means supplying the second driving voltage to the LED group in the compensation section of the n-th forward voltage level $V_{fn}$.

Further, the term "non-compensation section" (or "normally operating section") means a section in which the input voltage (first driving voltage) is supplied to an LED group to allow the LED group(s) to emit light as a section in which the voltage level of the input voltage (rectifying voltage) is equal to or more than a preset forward voltage level in the sequential driving scheme. The "non-compensation section" (or "normally operating section") in an embodiment in which the compensation of the first forward voltage level $V_{f1}$ is performed means a section in which the voltage level of the input voltage is equal to or more than the $V_{f1}$. The "non-compensation section" (or "normally operating section") in an embodiment in which the compensation of the second forward voltage level $V_{f2}$ is performed means a section in which the voltage level of the input voltage is equal to or more than the $V_{f2}$. Therefore, in an embodiment in which the compensation of the n-th forward voltage level $V_{fn}$ is performed, the "non-compensation section" (or "normally operating section") means a section in which the voltage level of the input voltage is equal to or more than the $V_{fn}$.

Further, the term "voltage level of an LED group" means a voltage level applied across a specific LED group. For example, the first LED group voltage level means a voltage level applied across the first LED group and the second LED group voltage level means a voltage level applied across the second LED group. Therefore, a term "voltage level of an n-th LED group" means a voltage level applied across an n-th LED group.

Further, terms such as "$V_1$," "$V_2$," "$V_3$," . . . , "$t_1$," "$t_2$," . . . , "T1," "$T_2$," "$T_3$," and the like, represent any specific voltage, specific timing, specific temperature, etc., within the present specification. These terms are not used to represent absolute values, but are used to be distinguished from each other.

Overview of LED Lighting Device

FIG. 1 is a schematic configuration block diagram of an LED lighting device according to an exemplary embodiment. A configuration and a function of an LED lighting device 1000 according to an exemplary embodiment will be schematically described with reference to FIG. 1.

First, the LED lighting device 1000 according to the exemplary embodiment may include an LED driving circuit 1500 which includes a rectifying module 1100, an LED driving module 1200, and a second driving voltage providing module 1400 and an LED light emitting module 1300 driven according to a control of the LED driving circuit.

The LED driving circuit 1500 receives an alternating voltage $V_{ac}$ from an alternating voltage source and rectifies the input alternating voltage to generate a rectifying voltage $V_{rec}$. Further, the LED driving circuit 1500 is configured to provide a first driving voltage to the LED light emitting module 1300 using the generated rectifying voltage $V_{rec}$ to control the driving of the LED light emitting module 1300. As described in more detail below, the LED driving circuit 1500 may rectify the input alternating voltage $V_{ac}$ and then control the driving of the LED light emitting module 1300 using the generated rectifying voltage. Thus, in an exemplary embodiment, the first driving voltage is the rectifying voltage $V_{rec}$. However, the LED driving circuit 1500 is not limited to using the rectifying voltage $V_{rec}$. Rather, the LED driving circuit 1500 may be applied to various cases in which a sequential driving scheme may be adopted. In other words, a magnitude of the input voltage may change over time. For example, the LED driving circuit 1500 may also be used to drive alternating LEDs (i.e., LED groups that are disposed non-parallel with each other) sequentially by directly receiving the alternating voltage $V_{ac}$.

Further, the LED driving circuit 1500 may be configured to perform a function of storing some of the first driving voltage for a normally operating section and then supplying energy stored for a compensation section to the LED light emitting module 1300 as a second driving voltage. With this configuration, the LED driving circuit 1500 may improve a flicker phenomenon by removing a non-emission section of the LED light emitting module 1300.

As illustrated in FIG. 1, the LED lighting device 1000 according to an exemplary embodiment includes the rectifying module 1100, the LED driving module 1200, the second driving voltage providing module 1400, and the LED light emitting module 1300.

Figure 2:
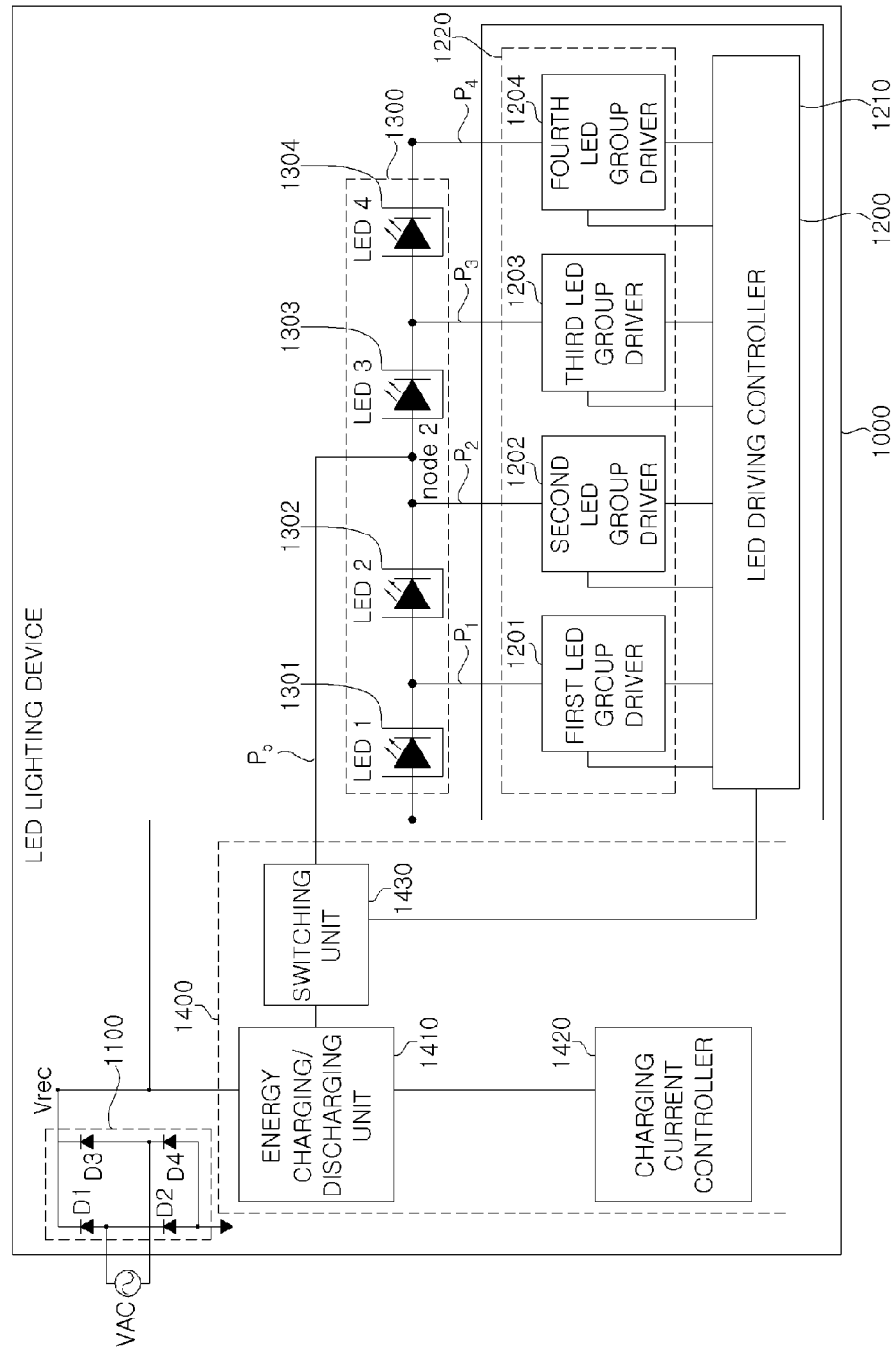
FIG. 2 is a detailed configuration block diagram of the LED lighting device according to the exemplary embodiment.
Figure 3:
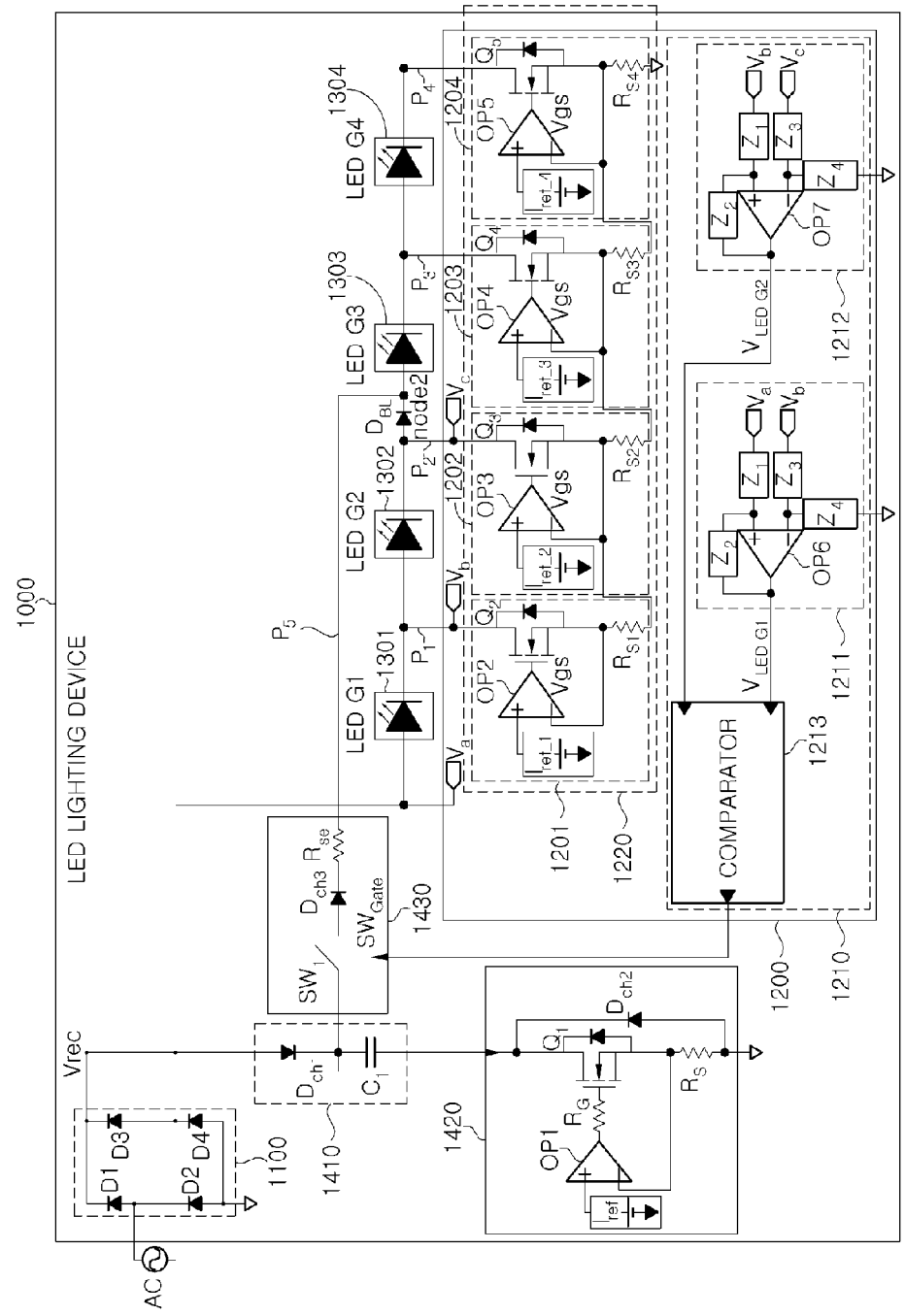
FIG. 3 is a circuit diagram of an LED lighting device including a second driving voltage providing module according to a first exemplary embodiment.

The LED light emitting module 1300 may be configured with a plurality of LED groups that sequentially emit light and sequentially turn-off according to the control of the LED driving module 1200. Although FIGS. 1 to 3 illustrate the LED light emitting module 1300 including a first LED group 1301, a second LED group 1302, a third LED group 1303, and a fourth LED group 1304, it will be obvious to those skilled in the art that the number of LED groups included in the LED light emitting module 1300 may vary.

The first LED group 1301, the second LED group 1302, the third LED group 1303, and the fourth LED group 1304 may each have different forward voltage levels. For example, the first LED group 1301, the second LED group 1302, the third LED group 1303, and the fourth LED group 1304 are each configured to include different numbers of LED devices and different forward voltage levels, respectively.

The rectifying module 1100 may be configured to rectify the alternating voltage $V_{ac}$ input from an external power supply to generate and output the rectifying voltage $V_{rec}$. A full-wave rectifying circuit and/or a half-wave rectifying circuit may be used as the rectifying module 1100. The rectifying voltage $V_{rec}$ output from the rectifying module 1100 is output to the LED light emitting module 1300, the LED driving module 1200, and the second driving voltage providing module 1400. FIGS. 2 and 3 illustrate a bridge full-wave rectifying circuit configured of four diodes D1, D2, D3, and D4.

The LED driving module 1200 may determine the magnitude of the input rectifying voltage and decide a size of the LED driving signal. The LED driving module 1200 may determine a timing and cut-off timing of the LED driving signal. The LED driving module 1200 may provide the LED driving signal to the LED light emitting module 1300 (i.e., each of the plurality of LED groups 1301 to 1304 included in the LED light emitting module 1300) depending on the determined magnitude of the rectifying voltage and the timing and a cut-off timing of the LED driving signal. More specifically, the LED driving module 1200 may be configured to provide the LED driving signal having the decided size to one or the plurality of LED group(s) (at least one of LED groups 1301 to 1304) at the decided timing of the LED driving signal. The LED driving module 1200 may be configured to stop providing the LED driving signal to one or the plurality of LED group(s) (at least one of 1301 to 1304) at the decided cut-off timing of the LED driving signal to control the driving of the LED light emitting module 1300.

The detailed configuration and function of the LED driving module 1200 according will be described below with reference to FIGS. 2 and 3.

Further, the LED driving module 1200 may further perform a function of controlling an operation of the second driving voltage providing module 1400. More specifically, the LED driving module 1200 may be configured to monitor a voltage level across at least one of the LED groups 1301 to 1304 or a current flowing in the LED group (i.e., any one of 1301 to 1304) to determine the compensation section. If the LED driving module 1200 determines that the LED group enters the compensation section, the second driving voltage providing module 1400 supplies the second driving voltage to the LED light emitting module 1300. If it is determined that the compensation section ends, the second driving voltage providing module 1400 stops supplying the second driving voltage. The second driving voltage providing module may be controlled by the LED driving module 1200.

The detailed contents of controlling the operation of the second driving voltage providing module 1400 of the LED driving module 1200 will be described below with reference to FIGS. 2 and 3.

The second driving voltage providing module 1400 may be configured to be positioned between the rectifying module 1100 and the LED light emitting module 1300 to receive the rectifying voltage (i.e., the first driving voltage) from the rectifying module 1100 to store energy and provide the stored energy to the LED light emitting module 1300 as the second driving voltage at the time of meeting a preset condition or according to the control of the LED driving module 1200.

The detailed configuration and function of the second driving voltage providing module 1400 according to the present invention will be described below with reference to FIGS. 2 to 3.

Configuration and Function of the LED Driving Module

FIG. 2 is a detailed configuration block diagram of the LED lighting device according to the embodiment of the present invention and FIG. 3 is a circuit diagram of an LED lighting device including a second driving voltage providing module according to a first embodiment of the present invention. Hereinafter, a detailed configuration and a function of the LED lighting device 1000 according to the embodiment of the present invention will be described with reference to FIGS. 2 and 3.

First, FIGS. 2 and 3 illustrate that the rectifying voltage $V_{rec}$ output from the rectifying module 1100 is identically applied to the LED light emitting module 1300 and the second driving voltage providing module 1400 connected in parallel, respectively, as an LED driving voltage $V_{LED}$ and a charging voltage $V_{charge}$. However, envisioned embodiments are not limited to this exemplified illustration. In other words, the LED driving voltage $V_{LED}$ supplied to the LED light emitting module 1300 and the charging voltage $V_{charge}$ provided to the second driving voltage providing module 1400 may be configured to be different. For clarity and simplicity only, the LED lighting device 1000 will be described based on having the rectifying voltage $V_{rec}$ output from the rectifying module 1100 and provided to the LED light emitting module 1300, the LED driving module 1200, and the second driving voltage providing module 1400 as the first driving voltage.

Function of Controlling Driving of LED

As illustrated in FIGS. 2 and 3, the LED driving module 1200 may include a plurality of LED group drivers 1220 and an LED driving controller 1210 to drive and control the LED groups 1301 to 1304.

The LED driving controller 1210 may be configured to determine a magnitude of the rectifying voltage input from the rectifying module 1100 and decide the size of the LED driving signal. The LED driving module 1200 may determine the timing and the cut-off timing of the LED driving signal. The LED driving controller 1210 may provide the LED driving signal to each of the LED groups 1301 to 1304 depending on the magnitude of the rectifying voltage and the determined timing and the cut-off timing of the LED driving signal. More specifically, the LED driving controller 1210 may be configured to control the LED group drivers 1220 (i.e., the first LED group driver 1201, the second LED group driver 1202, the third LED group driver 1203, and the fourth LED group driver 1204) at the decided timing of the LED driving signal for each LED group to provide the LED driving signal to the corresponding LED group(s) so as to turn on the corresponding LED group. The LED driving controller 1210 may be configured to control the LED group drivers 1220 at the decided cut-off timing of the LED driving signal for each LED group to cut-off providing the LED driving signal to the corresponding LED group(s) so as to turn-off the corresponding LED group. Further, unlike the LED driving controller 1210 performing only the sequential driving function according to the related art, the LED driving controller 1210 according to the present embodiment is configured to work with the second driving voltage providing module 1400 to provide the LED driving signal to an appropriate LED group(s) even in the compensation section to thereby keep the turn-on state of the corresponding LED group. The detailed description of this function will be described below with reference to FIG. 5.

The plurality of LED group drivers 1220 correspond to the plurality of LED groups 1301 to 1304 one-to-one and serve to provide the LED driving signal to each of the plurality of LED groups 1301 to 1304 or cut-off providing the LED driving signal according to the control of the LED driving controller 1210. As illustrated in FIGS. 2 and 3, the first LED group driver 1201 is connected to the first LED group 1301 and is configured to provide or cut-off the LED driving signal to the first LED group 1301 according to the control of the LED driving controller 1210. Similarly, the second LED group driver 1202 is connected to the second LED group 1302 and the third LED group driver 1203 is connected to the third LED group 1303 to serve to provide and cut-off the LED driving signal to and from the corresponding LED group. Further, similarly, the fourth LED group driver 1204 is connected to the fourth LED group 1304 and is configured to provide or cut-off the LED driving signal to the fourth LED group 1304 according to the control of the LED driving controller 1210.

As described above, the LED group drivers 1201 to 1204 may be each implemented using electronic switching devices such as a bipolar junction transistor (BJT) and a field effect transistor (FET) and the like. When the LED group drivers 1201 to 1204 are implemented using the electronic switching device, the LED driving controller 1210 uses a control signal in a pulse form to control a turn-on and a turn-off of the LED group drivers 1201 to 1204, respectively, thereby providing and cutting-off the LED driving signal to and from a specific LED group. FIG. 3 illustrates an embodiment in which the LED group driver 1220 is implemented as an N channel enhancement-mode MOSFET (E-MOSFET). Accordingly, in the exemplary embodiment illustrated in FIG. 3, when Vgs is 0, the LED group driver 1220 is turned-off.

More preferably, the LED group drivers 1201 to 1204 may each be configured to perform a constant current control function in addition to turn on/off control functions of the paths $P_1$, $P_2$, $P_3$, and $P_4$. To perform the constant current control function, as illustrated in FIG. 3, the LED group drivers 1201 to 1204 may each include one electronic switching device Q2, Q3, Q4, or Q5, one sensing resistor RS1, RS2, RS3, or RS4, and one differential amplifier OP2, OP3, OP4, or OP5. A voltage value corresponding to a reference current is input to a non-inversion input terminal of the differential amplifier OP2, OP3, OP4, or OP5. A voltage value (i.e., a voltage value corresponding to a current value flowing through a current path) applied across the sensing resistor $R_{S1}$, $R_{S2}$, $R_{S3}$, or $R_{S4}$ is input to an inversion input terminal of the differential amplifier OP2, OP3, OP4, or OP5. The differential amplifier OP2, OP3, OP4, or OP5 compares the voltage value input through the non-inversion input terminal with the voltage value input through the inversion input terminal to control a gate voltage of the electronic switching device Q2, Q3, Q4, or Q5, thereby performing the constant current control function.

When the second switch Q2 is turned-on to connect to the first current path P1, a reference voltage value corresponding to a first reference current $I_{ref\_1}$ is input to the non-inversion input terminal of the second differential amplifier OP2 and the voltage value (i.e., voltage value corresponding to a current flowing first LED driving current $I_{LED1}$) applied across the first sensing resistor $R_{S1}$ is input to the inversion input terminal of the second differential amplifier OP2. The second differential amplifier OP2 compares the reference voltage value with the voltage value applied across the first sensing resistor $R_{S1}$ to control the gate voltage of the second switch $Q_2$ to keep the first LED driving signal (driving current) $I_{LED1}$ currently flowing through the first LED group 1301 to be the first reference current $I_{ref\_1}$, thereby performing the constant current control function.

Similarly, when the second switch $Q_2$ is turned-off and the third switch $Q_3$ is turned-on to connect to the second current path P2, a reference voltage value corresponding to a second reference current $I_{ref\_2}$ is input to the non-inversion input terminal of the third differential amplifier OP3 and the voltage value (i.e., the voltage value corresponding to a current flowing second LED driving current $I_{LED2}$) applied across the second sensing resistor $R_{S2}$ is input to the inversion input terminal of the third differential amplifier OP3. The third differential amplifier OP3 compares the reference voltage value with the voltage value applied across the second sensing resistor $R_{S2}$ to control the gate voltage of the third switch $Q_3$ to keep a second LED driving signal (driving current)) $I_{LED2}$ currently flowing through the first LED group 1301 and the second LED group 1302 to be a second reference current $I_{ref\_2}$, thereby performing the constant current control function.

Further, when the third switch $Q_3$ is turned-off and the fourth switch $Q_4$ is turned-on to connect to the third current path P3, a reference voltage value corresponding to a third reference current $I_{ref\_3}$ is input to the non-inversion input terminal of the fourth differential amplifier OP4 and the voltage value (i.e., voltage value corresponding to a current flowing third LED driving current $I_{LED3}$) applied across the third sensing resistor $R_{S3}$ is input to the inversion input terminal of the fourth differential amplifier OP4. The fourth differential amplifier OP4 compares the reference voltage value with the voltage value applied across the third sensing resistor $R_{S3}$ to control the gate voltage of the fourth switch $Q_4$ to keep a third LED driving signal (driving current) $I_{LED3}$ currently flowing through the first LED group 1301, the second LED group 1302, and the third LED group 1303 to be a third reference current $I_{ref\_3}$, thereby performing the constant current control function.

Similarly, when the fourth switch $Q_4$ is turned-off and the fifth switch $Q_5$ is turned-on to connect to the fourth current path P4, a reference voltage value corresponding to a fourth reference current $I_{ref\_4}$ is input to the non-inversion input terminal of the fifth differential amplifier OP5 and the voltage value (i.e., voltage value corresponding to a current flowing fourth LED driving current $I_{LED4}$) applied across the fourth sensing resistor $R_{S4}$ is input to the inversion input terminal of the fifth differential amplifier OP5. The fifth differential amplifier OP5 compares the reference voltage value with the voltage value applied across the fourth sensing resistor $R_{S4}$ to control the gate voltage of the fifth switch $Q_5$ to keep a fourth LED driving signal (driving current) $I_{LED4}$ currently flowing through the first LED group 1301, the second LED group 1302, the third LED group 1303, and the fourth LED group 1304 to be a fourth reference current $I_{ref\_4}$, thereby performing the constant current control function.

The LED driving circuit 1500 may be configured to approximate the first to fourth LED driving currents $I_{LED1}$ to $I_{ILED4}$ to a sine wave by setting the values of the first reference current $I_{ref\_1}$, the second reference current $I_{ref\_2}$, the third reference current $I_{ref\_3}$, and the fourth reference current $I_{ref\_4}$ to be different from each other so that a waveform of the LED driving current may approximate to a waveform of the rectifying voltage in order to improve a power factor (PF) and total harmonic distortion (THD) characteristics. For example, the fourth LED group driver 1204 is operated by being applied with a fourth driving control signal (i.e., 4V) and may be configured to constant-current-control the fourth LED driving current $I_{LED4}$ based on 100 mA. Further, the third LED group driver 1203 is operated by being applied with the third driving control signal (i.e., 3V) and may be configured to constant-current-control the third LED driving current $I_{LED3}$ based on any one of 80 mA to 95 mA, which are 80% to 95% of the fourth LED driving current $I_{LED4}$. Similarly, the second LED group driver 1202 is operated by being applied with the second driving control signal (i.e., 2V) and may be configured to constant-current-control the second LED driving current $I_{LED2}$ based on any one of 65 mA to 80 mA, which are 65% to 80% of the fourth LED driving current $I_{LED4}$. Further, the first LED group driver 1201 is operated by being applied with the first driving control signal (i.e., 1V) and may be configured to constant-current-control the first LED driving current $I_{LED1}$ based on any one of 30 mA to 65 mA, which are 30% to 65% of the fourth LED driving current $I_{LED4}$.

Concept of Compensation Section and Non-Compensation Section (Normally Operating Section)

FIG. 4 is a waveform diagram for describing a compensation section of a four-stage sequential driving LED lighting device according to an exemplary embodiment. To describe the operation in the compensation section and the non-compensation section (normally operating section) of the LED lighting device 1000, a concept of the compensation section and the non-compensation section will be described.

FIG. 4 illustrates the voltage level of the rectifying voltage $V_{rec}$ and the waveform of the LED driving current $I_{LED}$ over time. As described above, the compensation section is a section in which the voltage level of the rectifying voltage $V_{rec}$ is below a preset forward voltage level of the LED and is a section in which the compensation is performed by the second driving voltage providing module 1400. Therefore, when the compensation of the first forward voltage level $V_{f1}$ is performed, in FIG. 4, the compensation section of the first forward voltage level $V_{f1}$ is a time section $t_0$ to $t_1$, $t_8$ to $t_{10}$, and $t_{17}$ to $t_{18}$. In this case, in FIG. 4, the non-compensation section is a time section $t_1$ to $t_8$ and $t_{10}$ to $t_{17}$. Further, when the compensation of the second forward voltage level $V_{f2}$ is performed, the compensation section of the second forward voltage level $V_{f2}$ is a time section $t_0$ to $t_2$, $t_7$ to $t_{11}$, and $t_{16}$ to $t_{18}$. In this case, in FIG. 4, the non-compensation section is a time section $t_2$ to $t_7$ and $t_{11}$ to $t_{16}$. The LED lighting device 1000 may be configured to perform only the compensation of the first forward voltage level $V_{f1}$, perform only the compensation of the second forward voltage level $V_{f2}$, or selectively perform any one of the compensation of the first forward voltage level $V_{f1}$ and the compensation of the second forward voltage level $V_{f2}$.

LED Driving Control

Figure 6:
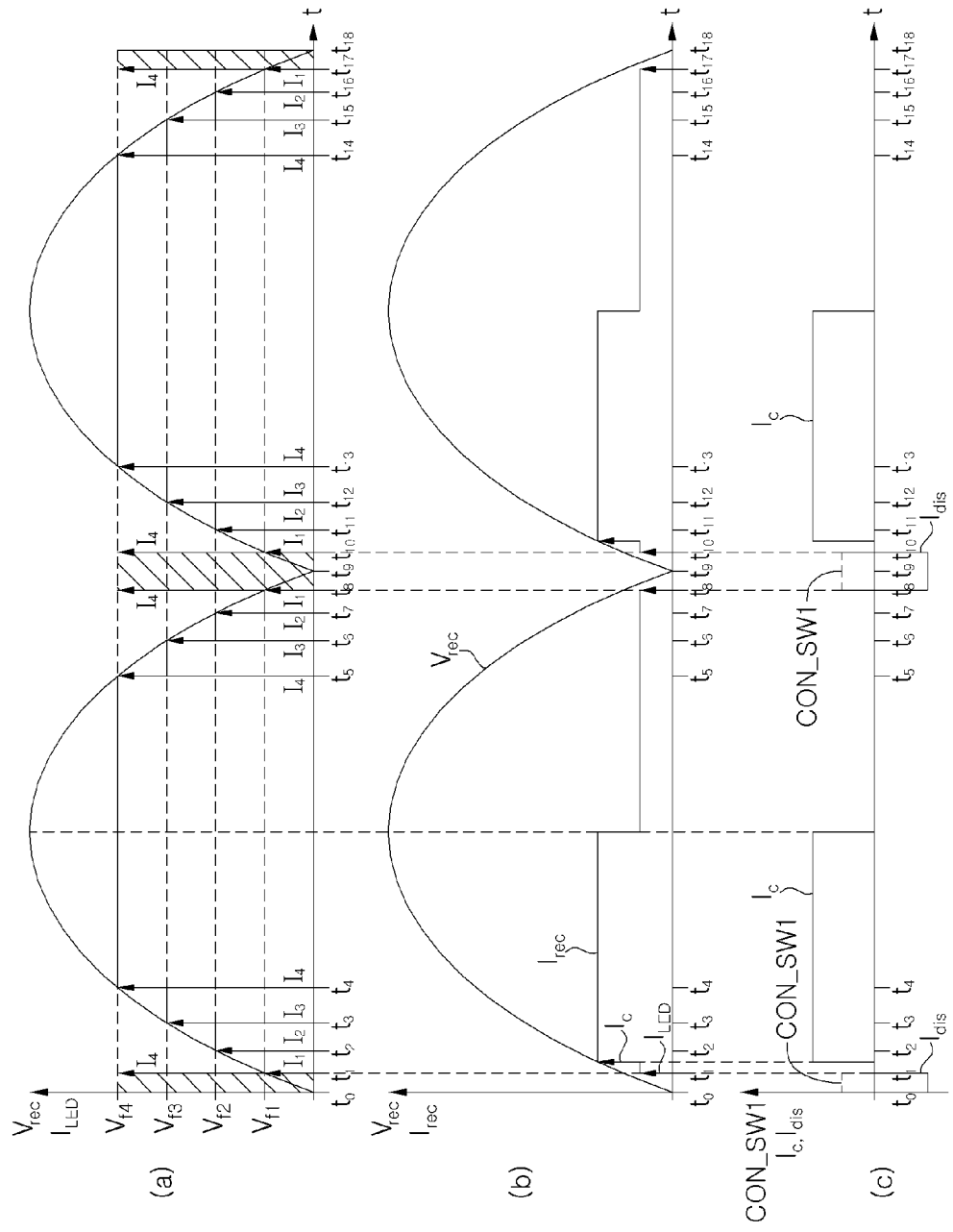
FIG. 6 illustrates a waveform diagram (a), a waveform diagram (b), and a waveform diagram (c) for describing a rectifying voltage, a rectifying current, an LED driving current, a charging/discharging control signal, and a charging current/discharging current of the LED lighting device compensating for a first forward voltage level according to an exemplary embodiment.
Figure 7:
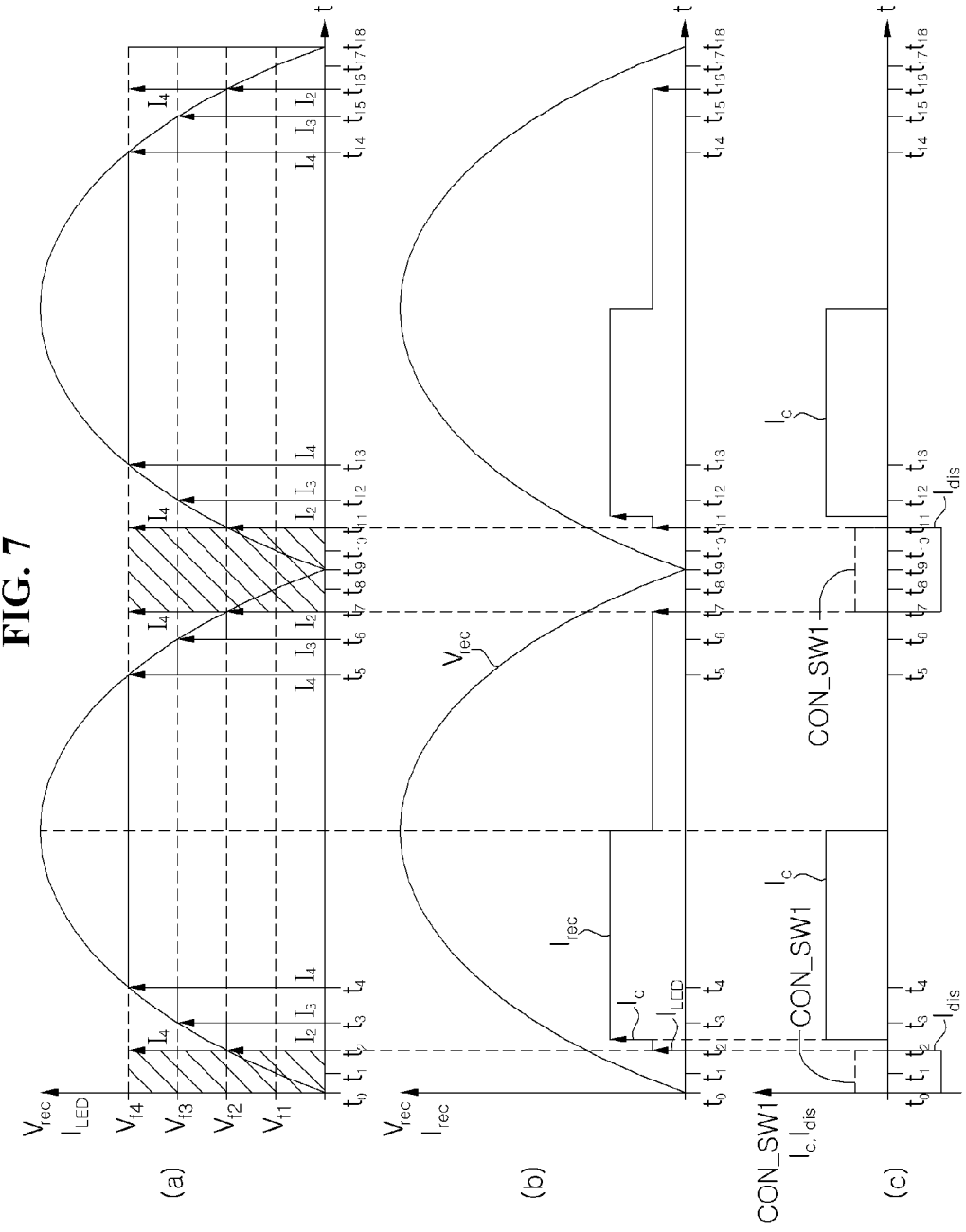
FIG. 7 illustrates a waveform diagram (a), a waveform diagram (b), and a waveform diagram (c) for describing a rectifying voltage, a rectifying current, an LED driving current, a charging/discharging control signal, and a charging current/discharging current of the LED lighting device compensating for a second forward voltage level according to an exemplary embodiment.

FIG. 6 illustrates a waveform diagram (a), a waveform diagram (b), and waveform diagram (c) for describing a rectifying voltage, a rectifying current, an LED driving current, a charging/discharging control signal, and a charging current/discharging current of the LED lighting device compensating for a first forward voltage level according to an exemplary embodiment. FIG. 7 illustrates a waveform diagram (a), a waveform diagram (b), and a waveform diagram (c) for describing a rectifying voltage, a rectifying current, an LED driving current, a charging/discharging control signal, and a charging current/discharging current of the LED lighting device compensating for a second forward voltage level according to an exemplary embodiment. The LED driving control in the non-compensation section and the LED driving control in the compensation section according to an exemplary embodiment will be described below in detail with reference to FIGS. 6 and 7.

1. LED Driving Control of LED Lighting Device Compensating for First Forward Voltage Level LED Driving Control in Non-Compensation Section In an exemplary embodiment configured to compensate for the first forward voltage $V_{f1}$, the LED driving control of the LED driving circuit 1500 in the non-compensation section will be described with reference to FIG. 6. The compensation section of the first forward voltage $V_{f1}$ is a section in which the voltage level of the rectifying voltage $V_{rec}$ is below the $V_{f1}$, and thus the non-compensation section is a section in which the voltage level of the rectifying voltage $V_{rec}$ is equal to or more than the $V_{f1}$. FIG. 6, illustrates in waveform diagram (a) that the rectifying voltage $V_{rec}$ is changed between 0 to $V_{rec}$ max over time. Therefore, the LED driving controller 1210 may determine the magnitude of the rectifying voltage $V_{rec}$. When the magnitude of the input rectifying voltage $V_{rec}$ is a magnitude at which only the first LED group 1301 may be driven (i.e., the voltage level of the rectifying voltage $V_{rec}$ belongs to the first forward voltage level ($V_{f1} \leq V_{rec} < V_{f2}$), which is time section $t_1$ to $t_2$, time section $t_7$ to $t_8$, time section $t_{10}$ to $t_{11}$, and time section $t_{16}$ to $t_{17}$ based on one period of the rectifying voltage), the LED driving controller 1210 controls the plurality of LED group drivers 1220 so that the first LED driving signal $I_{LED1}$ may be provided only to the first LED group 1301 of the four LED groups 1301 to 1304 through the first current path $P_1$. Similarly, the LED driving controller 1210 controls the plurality of LED group drivers 1220 to connect the first LED group 1301 and the second LED group 1302 in series and provide the second LED driving signal $I_{LED2}$ to the first LED group 1301 and the second LED group 1302, which are connected in series, through the second current path $P_2$ when the voltage level of the rectifying voltage $V_{rec}$ belongs to the second forward voltage level $(V_{f2} \leq V_{rec} < V_{f3})$ (i.e., time section $t_2$ to $t_3$ time section $t_6$ to $t_7$, time section $t_{11}$ to $t_{12}$, and time section $t_{15}$ to $t_{16}$ based on one period of the rectifying voltage). Further, the LED driving controller 1210 controls the plurality of LED group drivers 1220 to connect the first LED group 1301, the second LED group 1302, and the third LED group 1303 in series and provide the third LED driving signal $I_{LED3}$ to the first LED group 1301, the second LED group 1302, and the third LED group 1303 through the third current path $P_3$ when the voltage level of the rectifying voltage $V_{rec}$ belongs to the third forward voltage level $(V_{f3} \leq V_{rec} < V_{f4})$ (i.e., time section $t_3$ to $t_4$, time section $t_5$ to $t_6$, time section $t_{12}$ to $t_{13}$, and time section $t_{14}$ to $t_{15}$ based on one period of the rectifying voltage). Further, the LED driving controller 1210 controls the plurality of LED group drivers 1220 to connect the first LED group 1301, the second LED group 1302, the third LED group 1303, and the fourth LED group 1304 in series and provide the fourth LED driving signal $I_{LED4}$ to the first LED group 1301, the second LED group 1302, the third LED group 1303, and the fourth LED group 1304 through the fourth current path $P_4$ when the voltage level of the rectifying voltage $V_{rec}$ belongs to the fourth forward voltage level $(V_{f4} \leq V_{rec} < V_{rec\_max})$ (time section $t_4$ to $t_5$ and time section $t_{13}$ to $t_{14}$, based on one period of the rectifying voltage).

FIG. 6 illustrates a waveform diagram (b) of the voltage level of the rectifying voltage $V_{rec}$ output from the rectifying module 1100 and the rectifying current $I_{rec}$ over time. FIG. 6 also illustrates a wave form diagram (c) with a discharging switch control signal CON_SW1 that is output from the LED driving controller 1210 and is then input to the second driving voltage providing module 1400, a charging current $I_c$ input to the second driving voltage providing module 1400, and a discharging current $I_{dis}$ output from the second driving voltage providing module 1400 over time.

As illustrated, the voltage level of the rectifying voltage $V_{rec}$ is equal to or more than the $V_{f1}$ at the timing $t_1$. Thus, the LED driving controller 1210 disconnects between the second driving voltage providing module 1400 and the LED light emitting module 1300. The connection between the second driving voltage providing module 1400 and the LED light emitting module 1300 is controlled according to the discharging switch control signal CON_SW1 output from the LED driving controller 1210. When the discharging switch control signal CON_SW1 is input to the second driving voltage providing module 1400, the second driving voltage providing module 1400 may be connected to the LED light emitting module 1300. When the discharging switch control signal CON_SW1 is not input to the second driving voltage providing module 1400, the connection between the second driving voltage providing module 1400 and the LED light emitting module 1300 may be released. The connection between the second driving voltage providing module 1400 and the LED light emitting module 1300 is released and therefore the first driving voltage output from the rectifying module 1100 is applied to the LED light emitting module 1300, such that the rectifying current $I_{rec}$ flows. Some of the rectifying current $I_{rec}$ in the non-compensation section is used as the LED driving current $I_{LED}$ for driving the LED light emitting module 1300 and the rest thereof is used as the charging current $I_c$ for charging the second driving voltage providing module 1400. The charging current $I_c$ flows until the second driving voltage providing module 1400 is fully charged.

LED Driving Control in Compensation Section

As described above, the exemplary embodiment described with reference to FIG. 6 is configured to compensate for the first forward voltage level $V_{f1}$. Thus, the compensation section of the first forward voltage level is a time section $t_0$ to $t_1$ and a time section $t_8$ to $t_9$ based on one period of the rectifying voltage. The LED driving controller 1210 may be configured to supply the second driving voltage from the second driving voltage providing module 1400 to the LED light emitting module 1300 in the compensation section. When the compensation section ends, the LED driving controller 1210 cuts-off providing the second driving voltage from the second driving voltage providing module 1400.

The LED driving controller 1210 may be configured to determine the entry into the compensation section (i.e., second driving voltage providing timing) and the separation from the compensation section (i.e., second driving voltage cut-off timing) using one of largely three schemes.

1) Determination and Control of Compensation Section Based on Voltage Level of First LED Group 1301

The LED driving controller 1210 may be configured to determine a voltage level $V_{LED\_G1}$ across the first LED group 1301 to determine the entry into and the separation from the compensation section. As illustrated in FIG. 3, the LED driving controller 1210 may include a first LED group voltage detector 1211 and a comparator 1213 to perform the above function. The LED driving controller 1210 is configured to detect only the voltage level across the first LED group 1301 and determine the entry into and the separation from the compensation section based on the detected voltage level. Thus, the LED driving controller 1210 may not include the second LED group voltage detector 1212 illustrated in FIGS. 3 and 8.

The first LED group voltage detector 1211 is configured to detect and output an operating state of the first LED group 1301. In more detail, the first LED group voltage detector 1211 includes a sixth differential amplifier OP6, of which the non-inversion terminal receives a voltage $V_a$ of a node positioned before an anode terminal of the first LED group 1301 and the inversion terminal receives a voltage $V_b$ of a node positioned after a cathode terminal of the first LED group 1301. The sixth differential amplifier OP1 may output the signal corresponding to the voltage level $V_{LED\_G1}$ across the first LED group 1301. When the first LED group 1301 is normally operated (i.e., the first LED group 1301 emits light), the sixth differential amplifier OP6 outputs a signal (i.e., Sig_LED_G1_ON, signal of DC 5V, or signal in which the voltage level of the first LED group 1301 is scaled) corresponding to $V_{LED\_G1}$ (i.e., when the operating voltage of each LED group is 65V) of 65V. When the first LED group 1301 is abnormally operated (i.e., the first LED group 1301 does not emit light), the sixth differential amplifier OP6 outputs a signal (i.e., Sig_LED_G1_OFF, signal of DC 2.5V, or signal in which the voltage level of the first LED group is scaled) corresponding to $V_{LED\_G1}$ below 65V.

The comparator 1213 receives the signal Sig_LED_G1_ON or Sig_LED_G1_OFF corresponding to the detected $V_{LED\_G1}$ output from the sixth differential amplifier OP6 and controls the connection between the second driving voltage providing module 1400 and the LED light emitting module 1300 depending on the operating state of the first LED group 1301 to supply or cut-off the second driving voltage to or from the LED light emitting module 1300.

The comparator 1213 may be configured or set to compensate for the first forward voltage level $V_{f1}$ and therefore the comparator 1213 may be configured to control a switching unit 1430 based on the signal corresponding to the $V_{LED\_G1}$ output from the sixth differential amplifier OP6. For example, when the input signal is the signal Sig_LED_G1_OFF corresponding to the $V_{LED\_G1}$ which is below 65V (in FIG. 6, timing $t_0$ and timing $t_8$), the comparator 1213 may output a discharging switch control signal $SW_{Gate}$ to the switching unit 1430 to connect an energy charging/discharging unit 1410 to the LED light emitting module 1300 so as to compensate for the first forward voltage level $V_{f1}$. As the discharging switch control signal $SW_{Gate}$ is input to the switching unit 1430, a discharging switch $SW_1$ is turned-on and the fifth current path P5 is connected between the energy charging/discharging unit 1410 and the LED driving module 1200 to supply the second driving voltage to the LED driving module 1200. In this case, the second driving voltage is applied to the third LED group 1303 and the fourth LED group 1304 through a second node node2 and a fourth LED driving current $I_{LED4}$ flows through the fourth current path $P_4$. As described above, the fourth LED driving current $I_{LED4}$ is constant-current-controlled based on a preset fourth reference current $I_{REF4}$.

In the state in which the discharging switch $SW_1$ is turned-on, the comparator 1213 continuously monitors the $V_{LED\_G1}$ and at the timing when the $V_{LED\_G1}$ is 65V (i.e., timing when the voltage across the first LED group 1301 is a voltage level enough to drive the first LED group 1301 which is timing $t_1$ and timing $t_{10}$ in FIG. 6), stops outputting the discharging switch control signal $SW_{Gate}$ to disconnect between the energy charging/discharging unit 1410 and the LED light emitting module 1300. The discharging switch control signal $SW_{Gate}$ is not input, and therefore the discharging switch $SW_1$ is turned-off, the connection between the energy charging/discharging unit 1410 and the LED light emitting module 1300 is released. At the same time the fourth current path $P_4$ is disconnected and the first current path $P_1$ is connected, and thus the LED light emitting module 1300 is applied with the first driving voltage (rectifying voltage $V_{rec}$) to sequentially emit light in the non-compensation section.

The second driving voltage providing module 1400 decides to provide the second driving voltage to particular LED group(s) depending on the number of nodes within the LED light emitting module 1300 that are connected to the second driving voltage providing module 1400. In this application, the term "node" means a point that the second driving voltage providing module 1400 may be connected. For example, the node may be one point of a wire connecting between a cathode terminal of a specific LED group (i.e., k-th LED group) and an anode terminal of another specific LED group (i.e., k+1-th LED group) disposed subsequent to the specific LED group. Therefore, a first node is present between the first LED group 1301 and the second LED group 1302, a second node is present between the second LED group 1302 and the third LED group 1303, and a third node is present between the third LED group 1303 and the fourth LED group 1304. Similarly, the k-th node (1≤k≤n−1) is present between the k-th LED group and the k+1-th LED group. It is assumed that the first to n-th LED groups are included and the second driving voltage providing module 1400 is connected to the k-th node. In this case, the second driving voltage supplied from the second driving voltage providing module 1400 is applied to an anode terminal of the k+1-th LED group through the k-th node Therefore the first LED group to the k-th LED group are not supplied with the second driving voltage and thus do not emit light. The k+1-th LED group to n-th LED group are supplied with the second driving voltage and thus emit light. In an exemplary embodiment illustrated in FIGS. 2 and 3, the second driving voltage providing module 1400 is connected to a second node node 2 between the second LED group 1302 and the third LED group 1303.

The second driving voltage providing module 1400 is connected to the second node node 2 and the LED driving controller 1210 may be configured or set to compensate for the first forward voltage level $V_{f1}$. Therefore in the compensation sections $t_0$ to $t_1$, $t_8$ to $t_{10}$, and $t_{17}$ to $t_{18}$ of the first forward voltage level $V_{f1}$, the first LED group 1301 and the second LED group 1302 do not emit light and the third LED group 1303 and the fourth LED group 1304 are connected in series to be supplied with the second driving voltage from the second driving voltage providing module 1400 through the second node node2 so as to emit light. At the entry timing (timing when the $V_{LED\_G1}$ is below 65V, timings $t_8$ and $t_{17}$ of FIG. 6) into the compensation section of the first forward voltage level $V_{f1}$, the LED driving controller 1210 performs a control to turn-on the discharging switch $SW_1$ to connect the energy charging/discharging unit 1410 to the second node node 2 so as to provide the second driving voltage, performs a control to turn-on the fourth LED group driver 1204 to be connected to the fourth current path $P_4$, and controls the fourth LED group driver 1224 to keep the fourth LED driving current $I_{LED4}$ flowing through the fourth current path $P_4$ to be the fourth reference current $I_{REF4}$. With the passage of time, at the separation timing (timing when the $V_{LED\_G1}$ is 65V, timings $t_1$ and $t_{10}$ of FIGS. 4 and 6) from the compensation section of the first forward voltage level $V_{f1}$, the LED driving controller 1210 performs a control to turn-off the discharging switch $SW_1$ to disconnect between the energy charging/discharging unit 1410 and the second node node2 so as to cut-off supplying the second driving voltage, performs a control to turn-off the fourth LED group driver 1224 and turn-on the first LED group driver 1221 to be connected to the first current path $P_1$, and controls the first LED group driver 1221 to keep the first LED driving current $I_{LED1}$ flowing through the first current path $P_1$ to be the first reference current $I_{ref\_1}$.

The second driving voltage providing module 1400 may be connected to a specific node (i.e., k-th node) within the LED driving module 1200. Thus, the LED driving module 1200 may further include a reverse current preventing diode for preventing the LED driving current generated due to the application of the second driving voltage from flowing in the k-th LED group. Referring to FIG. 3, it may be appreciated that the second driving voltage providing module 1400 is configured to be connected to the second node node 2 within the LED driving module 1200, Thus, the reverse current preventing diode DBL is provided between the cathode terminal of the second LED group and the second node.

2) Determination and Control of Compensation Section Based on LED Driving Current The LED driving controller 1210 may be configured to determine the value of the LED driving current flowing in any one of the LED groups to determine the entry into and the separation from the compensation section. In other words, the LED group (any one of 1301 to 1304) also has diode characteristics. Thus, when the LED current flowing in the LED group(s) is 0 or the LED current is gradually reduced to reach a preset current value by the device characteristics, the LED driving controller 1210 may be configured to determine the entry into the compensation section. Similarly, the LED driving controller 1210 may be configured to determine the separation from the compensation section when the LED current flowing through one of the LED group(s) that is not provided the second driving voltage reaches a preset current value. In FIG. 6, the LED driving circuit 1500 may be configured to compensate for the first forward voltage level $V_{f1}$. The LED driving controller 1210 may be configured to monitor the first LED driving current $I_{LED1}$ value flowing through the first current path $P_1$ in the state that the first current path $P_1$ is connected to determine the entry into the compensation section when the first LED driving current $I_{LED1}$ falls to be equal to or less than a preset value (i.e., 90% of the first reference current $I_{ref\_1}$, etc.) and determine the separation from the compensation section when the first LED driving current $I_{LED1}$ rises to be equal to or more than the preset value. The function of the LED driving controller 1210 depends on the entry into and the separation from the compensation section similar to what has previously been described.

3) Determination and Control of Compensation Section Depending on Synchronization and Clock Counting Meanwhile, the LED driving controller 1210 according to another embodiment of the present invention may also be configured to determine the entry into and the separation from the compensation section depending on the driving time. For example, the LED driving controller 1210 according to the present invention may be configured to use an oscillator (not illustrated) oscillated at an integer multiple of a frequency of the alternating voltage $V_{ac}$ to generate a clock signal, synchronize the generated clock signal with the alternating voltage, and then count the clock signal, thereby determining the entry timing into and the separation timing from the compensation section of the first forward voltage $V_{f1}$. In this manner, when the LED driving controller 1210 is configured to determine the compensation section of the first forward voltage $V_{f1}$, the number of clocks corresponding to the entry timings into the compensation section of the first forward voltage $V_{f1}$ and the number of clocks corresponding to the separation timing from the compensation section of the first forward voltage $V_{f1}$ are stored in the LED driving controller 1210 and the LED driving controller 1210 counts the clock generated/output through the oscillator and when the number of counted clocks reaches the entry timing into the compensation section of the first forward voltage $V_{f1}$, determines the entry into the compensation section of the first forward voltage $V_{f1}$ and when the number of counted clocks reaches the separation timing from the compensation section of the first forward voltage $V_{f1}$, determines the separation from the compensation section of the first forward voltage $V_{f1}$. The function of the LED driving controller 1210 depending on the entry into and the separation from the compensation section of the first forward voltage $V_{f1}$ is similar to the foregoing description and therefore will be no more described below.

2. LED Driving Control of LED Lighting Device Compensating for Second Forward Voltage LED Driving Control in Non-Compensation Section Next, in an exemplary embodiment configured to compensate for the second forward voltage $V_{f2}$, the LED driving control of the LED driving circuit 1500 in the non-compensation section will be described with reference to FIG. 7. The compensation section of the second forward voltage $V_{f2}$ is a section in which the voltage level of the rectifying voltage $V_{rec}$ is below the $V_{f2}$, and thus the non-compensation section is a section in which the voltage level of the rectifying voltage $V_{rec}$ is equal to or more than the $V_{f2}$. As illustrated in the waveform diagram (a) of FIG. 7, the rectifying voltage $V_{rec}$ is changed between 0 to $V_{rec}$ max over time. Therefore, the LED driving controller 1210 may determine the magnitude of the rectifying voltage $V_{rec}$ in the non-compensation section and controls the plurality of LED group drivers 1220 to connect the first LED group 1301 and the second LED group 1302 in series and provide the second LED driving signal $I_{LED2}$ to the first LED group 1301 and the second LED group 1302, which are connected in series, through the second current path $P_2$ when the voltage level of the input rectifying voltage $V_{rec}$ belongs to the second forward voltage level ($V_{f2} \leq V_{rec} < V_{f3}$) (time section $t_2$ to $t_3$, time section $t_6$ to $t_7$ based on one period of the rectifying voltage). Further, the LED driving controller 1210 controls the plurality of LED group drivers 1220 to connect the first LED group 1301, the second LED group 1302, and the third LED group 1303 in series and provide the third LED driving signal $I_{LED3}$ to the first LED group 1301, the second LED group 1302, and the third LED group 1303 through the third current path $P_3$ when the voltage level of the rectifying voltage $V_{rec}$ belongs to the third forward voltage level ($V_{f3} \leq V_{rec} < V_{f4}$) (time section $t_3$ to $t_4$, time section $t_5$ to $t_6$ based on one period of the rectifying voltage). Further, the LED driving controller 1210 controls the plurality of LED group drivers 1220 to connect the first LED group 1301, the second LED group 1302, the third LED group 1303, and the fourth LED group 1304 in series and provide the fourth LED driving signal $I_{LED4}$ to the first LED group 1301, the second LED group 1302, the third LED group 1303, and the fourth LED group 1304 through the fourth current path $P_4$ when the voltage level of the rectifying voltage $V_{rec}$ belongs to the fourth forward voltage level ($V_{f4} \leq V_{rec} < V_{rec\_max}$) (time section $t_4$ to $t_5$ based on one period of the rectifying voltage).

FIG. 7 illustrates a waveform diagram (b) of the voltage level of the rectifying voltage $V_{rec}$ output from the rectifying module 1100 and the rectifying current $I_{rec}$ over time. FIG. 7 also illustrates a waveform diagram (c) discharging switch control signal CON_SW1 which is output from the LED driving controller 1210 and is then input to the driving voltage providing module 1400, a charging current $I_c$ input to the second driving voltage providing module 1400, and a discharging current $I_{dis}$ output from the second driving voltage providing module 1400 over time.

As illustrated, the voltage level of the rectifying voltage $V_{rec}$ is equal to or more than the $V_{f2}$ at the timing $t_2$. Thus the LED driving controller 1210 disconnects between the second driving voltage providing module 1400 and the LED light emitting module 1300. The connection between the second driving voltage providing module 1400 and the LED light emitting module 1300 is released and thus the first driving voltage output from the rectifying module 1100 is applied to the LED light emitting module 1300 such that the rectifying current $I_{rec}$ flows. Some of the rectifying current $I_{rec}$ in the non-compensation section is used as the LED driving current $I_{LED}$ for driving the LED light emitting module 1300 and the rest of the rectifying current $I_{rec}$ is used as the charging current $I_c$ for charging the second driving voltage providing module 1400. The charging current $I_c$ flows until the second driving voltage providing module 1400 is fully charged.

LED Driving Control in Compensation Section

As described above, the embodiment described with reference to FIG. 7 is configured to compensate for the second forward voltage level $V_{f2}$. Thus in the exemplary embodiment, the compensation section of the second forward voltage level is the time section $t_0$ to $t_2$ and the time section $t_7$ to $t_9$ based on one period of the rectifying voltage. The LED driving controller 1210 may be configured to supply the second driving voltage from the second driving voltage providing module 1400 to the LED light emitting module 1300 in the compensation section and when the compensation section ends, cut-off providing the second driving voltage from the second driving voltage providing module 1400.

The LED driving controller 1210 may be configured to determine the entry into the compensation section (i.e., second driving voltage providing timing) and the separation from the compensation section (i.e., second driving voltage cut-off timing) using one of largely three schemes.

1) Determination and Control of Compensation Section Based on Voltage Level of Second LED Group 1302

The LED driving controller 1210 may be configured to determine a voltage level $V_{LED\ G2}$ across the second LED group 1302 to determine the entry into and the separation from the compensation section. As illustrated in FIG. 3, the LED driving controller 1210 may include the second LED group voltage detector 1212 and the comparator 1213 to perform the above function. The LED driving controller 1210 may be configured to detect only the voltage level across the second LED group 1302 and determine the entry into and the separation from the compensation section based on the detected voltage level. Thus, the LED driving controller 1210 may not include the first LED group voltage detector 1211 illustrated in FIGS. 3 and 8.

The second LED group voltage detector 1212 may be configured to detect and output the operating state of the second LED group 1302. More specifically, the second LED group voltage detector 1212 includes a seventh differential amplifier OP7 that has a non-inversion terminal that receives the voltage $V_b$ of the node positioned before an anode terminal of the second LED group 1302 and also has an inversion terminal that receives a voltage $V_c$ of the node positioned after a cathode terminal of the second LED group 1302. The seventh differential amplifier OP& may output a signal corresponding to the voltage level $V_{LED\ G2}$ across the second LED group 1302. When the second LED group 1302 is normally operated (i.e., when the second LED group 1302 emits light), the seventh differential amplifier OP7 outputs a signal Sig_LED_G2_ON corresponding to the $V_{LED\ G2}$ of 65V. When the second LED group 1302 is abnormally operated (i.e., when the second LED group 1302 does not emit light), the seventh differential amplifier OP7 outputs the signal Sig_LED_G2_OFF corresponding to the $V_{LED\ G2}$ below 65V.

The comparator 1213 receives the signal Sig_LED_G2_ON or Sig_LED_G2_OFF corresponding to the detected $V_{LED\ G2}$ output from the seventh differential amplifier OP7 and controls the connection between the second driving voltage providing module 1400 and the LED light emitting module 1300 depending on the operating state of the second LED group 1302 to supply or cut-off the second driving voltage to or from the LED light emitting module 1300.

The comparator 1213 may be configured or set to compensate for the second forward voltage level $V_{f2}$. Thus, the comparator 1213 may be configured to control a switching unit 1430 based on the signal Sig_LED_G2_ON or Sig_LED_G2_OFF corresponding to the $V_{LED\ G2}$ output from the seventh differential amplifier OP7. For example, when the detected $V_{LED\ G2}$ is below 65V (in FIG. 7, timing $t_0$ and timing $t_7$), the comparator 1213 may output a discharging switch control signal $SW_{Gate}$ to the switching unit 1430 to connect an energy charging/discharging unit 1410 to the LED light emitting module 1300 to compensate for the second forward voltage level $V_{f2}$. As the discharging switch control signal $SW_{Gate}$ is input to the switching unit 1430, a discharging switch $SW_1$ is turned-on and the fifth current path $P_5$ is connected between the energy charging/discharging unit 1410 and the LED driving module 1200 to supply the second driving voltage to the LED driving module 1200. In this case, the second driving voltage is applied to the third LED group 1303 and the fourth LED group 1304 through a second node node 2 and a fourth LED driving current $I_{LED4}$ flows through the fourth current path $P_4$. As described above, the fourth LED driving current $I_{LED4}$ is constant-current-controlled based on a preset fourth reference current $I_{ref\_4}$.

In the state in which the discharging switch $SW_1$ is turned-on, the comparator 1213 continuously monitors the $V_{LED\ G2}$. At the timing (i.e., timing when the voltage across the second LED group 1302 is a voltage level enough to drive the second LED group 1302) (in FIG. 7, timing $t_2$ and timing $t_{11}$) when the $V_{LED\ G2}$ is 65V, the comparator 1213 stops outputting the discharging switch control signal $SW_{Gate}$ to disconnect between the energy charging/discharging unit 1410 and the LED light emitting module 1300. The discharging switch control signal $SW_{Gate}$ is not input. Thus, the discharging switch $SW_1$ is turned-off, the connection between the energy charging/discharging unit 1410 and the LED light emitting module 1300 is released and at the same time the fourth current path $P_4$ is disconnected and the second current path $P_2$ is connected. Thus the LED light emitting module 1300 is applied with the first driving voltage (rectifying voltage $V_{rec}$) to sequentially emit light in the non-compensation section.

The second driving voltage providing module 1400 is connected to the second node node 2 and the LED driving controller 1210. The second driving voltage providing module 1400 may configured or set to compensate for the second forward voltage level $V_{f2}$. Thus, in the compensation sections $t_0$ to $t_2$, $t_7$ to $t_{11}$, and $t_{16}$ to $t_{18}$ of the second forward voltage level $V_{f2}$, the first LED group 1301 and the second LED group 1302 do not emit light and the third LED group 1303 and the fourth LED group 1304 are connected in series to be supplied with the second driving voltage from the second driving voltage providing module 1400 through the second node node2 do emit light. Therefore, at the entry timing (timing when the $V_{LED\ G2}$ is below 65V, timings $t_7$ and $t_{16}$ of FIG. 7) into the compensation section of the second forward voltage level $V_{f2}$, the LED driving controller 1210 performs a control to turn-on the discharging switch $SW_1$ to connect the energy charging/discharging unit 1410 to the second node node2 so as to provide the second driving voltage, performs a control to turn-on the fourth LED group driver 1224 to be connected to the fourth current path $P_4$, and controls the fourth LED group driver 1224 to keep the fourth LED driving current $I_{LED4}$ flowing through the fourth current path $P_4$ to be the fourth reference current $I_{REF4}$. With the passage of time, at the separation timing (timing when the $V_{LED\ G2}$ is 65V, timings $t_2$ and $t_{11}$ of FIG. 7) from the compensation section of the second forward voltage level $V_{f2}$, the LED driving controller 1210 performs a control to turn-off the discharging switch $SW_1$ to disconnect between the energy charging/discharging unit 1410 and the second node node 2 so as to cut-off supplying the second driving voltage, performs a control to turn-off the fourth LED group driver 1224 and turn-on the second LED group driver 1202 to be connected to the second current path P$_2$, and controls the second LED group driver 1222 to keep the second LED driving current I$_{LED2}$ flowing through the second current path P$_2$ to be the second reference current I$_{ref\_2}$.

2) Determination and Control of Compensation Section Based on LED Driving Current The LED driving controller 1210 may be configured to determine the value of the LED driving current flowing in any one of the LED groups to determine the entry into and the separation from the compensation section. In the exemplary embodiment described with reference to FIG. 7, the LED driving circuit 1500 is configured to compensate for the second forward voltage level V$_{f2}$. Thus, the LED driving controller 1210 may also be configured to monitor the second LED driving current I$_{LED2}$ value flowing through the second current path P$_2$ in the state in which the second current path P$_2$ is connected to determine the entry into the compensation section when the second LED driving current I$_{LED2}$ falls to be equal to or less than a preset value (i.e., 90% of the second reference current I$_{ref\_2}$, etc.) and determine the separation from the compensation section when the second LED driving current I$_{LED2}$ rises to be equal to or more than the preset value. The function of the LED driving controller 1210 depending on the entry into and the separation from the compensation section is similar to the foregoing description and therefore will be no more described below.

3) Determination and Control of Compensation Section Depending on Synchronization and Clock Counting The LED driving controller 1210 may also be configured to determine the entry into and the separation from the compensation section depending on the driving time. For example, the LED driving controller 1210 may be configured to use the oscillator (not illustrated) oscillated at an integer multiple of the frequency of the alternating voltage Vac to generate the clock signal, synchronize the generated clock signal with the alternating voltage, and then count the clock signal, thereby determining the entry timing into and the separation timing from the compensation section. In this manner, when the LED driving controller 1210 is configured to determine the compensation section, the number of clocks corresponding to the entry timing into the compensation section of the second forward voltage V$_{f2}$ and the number of clocks corresponding to the separation timing from the compensation section are stored in the LED driving controller 1210 and the LED driving controller 1210 counts the clock generated/output through the oscillator. The LED driving controller 1210 determines the entry into the compensation section when the number of counted clocks reaches the entry timing of the compensation section of the second forward voltage V$_{f2}$ and determines the separation from the compensation section when the number of counted clocks reaches the separation timing of the compensation section of the second forward voltage V$_{f2}$. The function of the LED driving controller 1210 depends on the entry into and the separation from the compensation section of the second forward voltage V$_{f2}$ as discussed in the forgoing description.

3. LED Driving Control of LED Lighting Device Selectively Compensating for First Forward Voltage Level or Second Forward Voltage Level LED Driving Control in Non-Compensation Section When the LED driving controller 1210 is configured to selectively compensate for the first forward voltage level V$_{f1}$ or the second forward voltage level V$_{f2}$, the LED driving controller 1210 may control the driving of the LED in the non-compensation section depending on any one of the LED driving control scheme in the non-compensation section, depending on the compensation of the first forward voltage level V$_{f1}$, or the LED driving control scheme in the non-compensation section depending on the compensation of the second forward voltage level V$_{f2}$. In other words, when set to compensate for the first forward voltage level V$_{f1}$, the LED driving controller 1210 may use the first driving voltage in the section in which the voltage level of the rectifying voltage V$_{rec}$ is equal to or more than the V$_{f1}$ to sequentially drive the LED groups 1301 to 1304. Further, when set to compensate for the second forward voltage level V$_{f2}$, the LED driving controller 1210 may use the first driving voltage in the section in which the voltage level of the rectifying voltage V$_{rec}$ is equal to or more than the V$_{f2}$ to sequentially drive the LED groups 1301 to 1304. The foregoing control scheme is the same as the foregoing description and therefore the description of the overlapping contents will be omitted.

LED Driving Control in Compensation Section

When selectively compensating for the first forward voltage level V$_{f1}$ or the second forward voltage level V$_{f2}$, the LED driving controller 1210 may control the driving of the LED in the non-compensation section depending on any one of the LED driving control scheme in the non-compensation section depending on the compensation of the first forward voltage level V$_{f1}$ or the LED driving control scheme in the non-compensation section depending on the compensation of the second forward voltage level V$_{f2}$.

The LED driving controller 1210 may be configured to determine the entry into the compensation section (i.e., second driving voltage providing timing) and the separation from the compensation section (i.e., second driving voltage cut-off timing) using one of largely three schemes.

1) Determination and Control of Compensation Section Based on Voltage Level Across First LED Group 1301 and/or Second LED Group 1302

The LED driving controller 1210 may be configured to determine a voltage level V$_{LED\_G1}$ across the first LED group 1301 and/or the voltage level V$_{LED\_G2}$ across the second LED group 1302 to determine the entry into and the separation from the compensation section. As illustrated in FIG. 3, the LED driving controller 1210 may include the first LED group voltage detector 1211, the second LED group voltage detector 1212, and the comparator 1213 to perform the above function.

The first LED group voltage detector 1211 is configured to detect and output the operating state of the first LED group 1301. More specifically, the first LED group voltage detector 1211 includes a sixth differential amplifier OP6 having a non-inversion terminal that receives the voltage V$_a$ of the node positioned before the anode terminal of the first LED group 1301 and an inversion terminal that receives the voltage V$_b$ of the node positioned after the cathode terminal of the first LED group 1301, The sixth differential amplifier OP6 may output the signal Sig_LED_G1_ON or Sig_LED_G1_OFF corresponding to the voltage level V$_{LED\_G1}$ across the first LED group 1301. When the first LED group 1301 is normally operated (i.e., when the first LED group 1301 emits light), the sixth differential amplifier OP6 outputs a signal Sig_LED_G1_ON corresponding to the V$_{LED\_G1}$ of 65V. When the first LED group 1301 is abnormally operated (i.e, when the first LED group 1301 does not emit light), outputs the signal Sig_LED_G1_OFF corresponding to the V$_{LED\_G1}$ below 65V.

Similarly, the second LED group voltage detector 1212 is configured to detect and output the operating state of the second LED group 1302. More specifically, the second LED group voltage detector 1212 includes a seventh differential amplifier OP7 having a non-inversion terminal that receives the voltage $V_b$ of the node positioned before an anode terminal of the second LED group 1302 and an inversion terminal that receives a voltage $V_c$ of the node positioned after a cathode terminal of the second LED group 1302. The seventh differential amplifier OP7 outputs the signal Sig_LED_G2_ON or Sig_LED_G2_OFF corresponding to the voltage level $V_{LED\_G2}$ across the second LED group 1302. When the second LED group 1302 is normally operated (i.e., when the second LED group 1302 emits light), the seventh differential amplifier OP7 outputs a signal Sig_LED_G2_ON corresponding to the $V_{LED\_G2}$ of 65V and when the second LED group 1302 is abnormally operated (i.e., when the second LED group 1302 does not emit light), outputs the signal Sig_LED_G2_OFF corresponding to the $V_{LED\_G2}$ below 65V.

The comparator 1213 receives the signal Sig_LED_G1 corresponding to the detected $V_{LED\_G1}$ output from the sixth differential amplifier OP6 and the signal Sig_LED_G2 corresponding to the detected $V_{LED\_G2}$ output from the seventh differential amplifier OP7 and controls the switching unit 1430 depending on the operating state of the first LED group 1301 and the second LED group 1302 to connect or disconnect the energy charging/discharging unit 1410 to or from the LED light emitting module 1300.

When the comparator 1213 according to the present invention is set to perform the compensation of first forward voltage level $V_{f1}$, the comparator 1213 is configured to control the switching unit 1430 based on the signal Sig_LED_G1 corresponding to the $V_{LED\_G1}$ output from the sixth differential amplifier OP6. For example, when the input signal Sig_LED_G1 means that the $V_{LED\_G1}$ is below 65V, the comparator 1213 may output a discharging switch turn-on on control signal $SW_{Gate\_on}$ to the switching unit 1430 to connect an energy charging/discharging unit 1410 to the LED light emitting module 1300 to compensate for the first forward voltage level $V_{f1}$. In the state in which the discharging switch $SW_1$ is turned-on, the comparator 1213 continuously monitors the $V_{LED\_G1}$ and outputs a discharging switch turn-off control signal $SW_{Gate\_OFF}$ to the switching unit 1430 to disconnect the energy charging/discharging unit 1410 and the LED light emitting module 1300 at the timing when the $V_{LED\_G1}$ is 65V.

When the comparator 1213 is set to perform the compensation of second forward voltage level $V_{f2}$, the comparator 1213 is configured to control the switching unit 1430 based on the signal Sig_LED_G1 corresponding to the detected $V_{LED\_G1}$ output from the sixth differential amplifier OP6 and the signal Sig_LED_G2 corresponding to the detected $V_{LED\_G2}$ output from the seventh differential amplifier OP7. For example, at the timing (timings $t_7$ and $t_{16}$ of FIG. 6) when the input $V_{LED\_G1}$ is below 65V and at the same time the $V_{LED\_G2}$ is below 65V, the comparator 1213 outputs a discharging switch control signal $SW_{Gate}$ to the switching unit 1430 to connect an energy charging/discharging unit 1410 to the LED light emitting module 1300 to compensate for the second forward voltage level $V_{f2}$. In the state in which the discharging switch $SW_1$ is turned-on, the comparator 1213 continuously monitors the $V_{LED\_G1}$ and the $V_{LED\_G2}$ and at the timing (i.e., timing when both of the first $V_{LED\_G1}$ and the second LED group 1302 may be normally operated) (in FIG. 6, timings $t_2$ and $t_{11}$) when both of the $V_{LED\_G1}$ and the $V_{LED\_G2}$ are 65V. The comparator may stop outputting the discharging switch turn-off control signal $SW_{Gate\_off}$ to disconnect between the energy charging/discharging unit 1410 and the LED light emitting module 1300.

In the section in which the $V_{LED\_G1}$ is 65V but the $V_{LED\_G2}$ is below 65V, the voltage level of the applied rectifying voltage $V_{rec}$ may be a voltage level at which the first LED group 1301 may be driven. Thus, the LED driving controller 1210 may be configured to control the first LED group driver 1221 to be connected to the first current path $P_1$, so that the first LED group 1301 may emit light. Therefore, in this case, in the section in which the $V_{LED\_G1}$ is 65V but the $V_{LED\_G2}$ is below 65V (in FIG. 6), the first current path $P_1$ and the fourth current path $P_4$ are simultaneously connected and thus the first LED group 1301, the third LED group 1303, and the fourth LED group 1304 may simultaneously emit light. In this case, the first LED driving current $I_{LED1}$ flowing in the first LED group 1301 through the first current path $P_1$ is constant-current-controlled based on the first reference current $I_{REF1}$ by the first LED group driver 1201 and the fourth LED driving current $I_{LED4}$ flowing in the third LED group 1303 and the fourth LED group 1304 through the fourth current path $P_4$ is constant-current-controlled based on the fourth reference current $I_{REF4}$ by the fourth LED group driver 1204. The control will be described below in more detail with reference to FIG. 7.

2) Determination and Control of Compensation Section Based on LED Driving Current Meanwhile, the LED driving controller 1210 may be configured to determine the value of the LED driving current flowing in any one of the LED groups to determine the entry into and the separation from the compensation section. As described above, the LED driving controller 1210 may be configured to selectively compensate for the first forward voltage level $V_{f1}$ or the second forward voltage level $V_{f2}$ depending on the setting. Therefore, when set to compensate for the first forward voltage level $V_{f1}$, the LED driving controller 1210 may monitor the first LED driving current $I_{LED1}$ as described above to determine the entry into and the separation from the compensation section. Further, when set to compensate for the second forward voltage level $V_{f2}$, the LED driving controller 1210 may monitor the second LED driving current $I_{LED2}$ as described above to determine the entry into and the separation from the compensation section.

Further, as described above, in the case in which the first LED group 1301 is configured to emit light through the first current path $P_1$ and at the same time the third LED group 1303 and the fourth LED group 1304 are configured to emit light through the fifth current path $P_5$ and the fourth current path $P_4$ when the second forward voltage level $V_{f2}$ is compensated and the first LED group 1301 may be operated. The LED driving controller 1210 determines the entry into and the separation from the compensation section based on the second LED driving current $I_{LED2}$ as described above and at the same time the LED driving controller 1210 may be configured to control the connection of the first current path $P_1$ based on the first LED driving current $I_{LED1}$ as described above.

3) Determination and Control of Compensation Section Depending on Synchronization and Clock Counting As described above, the LED driving controller 1210 may also be configured to determine the entry into and the separation from the compensation section depending on the driving time. In the exemplary embodiment configured to selectively compensate for the first forward voltage level $V_{f1}$ and the second forward voltage level $V_{f2}$ depending on the setting, the LED driving controller 1210 stores the number of clocks corresponding to the entry into and the separation from the compensation section at the time of the compensation of the first forward voltage level $V_{f1}$ and the number of clocks corresponding to the entry into and the separation from the compensation section at the time of the compensation of the second forward voltage level $V_{f2}$, respectively the LED driving controller 1210 and may be configured to determine the compensation section based on the number of clocks corresponding to any one of the entry timing into and the separation timing from the compensation section depending on the setting. The function of the LED driving controller 1210 depending on the entry into and the separation from the compensation section is similar to the foregoing description and therefore will be no more described below.

Configuration and Function of Second Driving Voltage Providing Module

First Embodiment of Second Driving Voltage Providing Module

Hereinafter, the configuration and function of the second driving voltage providing module 1400 according to the first exemplary embodiment will be described with reference to FIGS. 2 and 3. As illustrated in FIGS. 2 and 3, the second driving voltage providing module 1400 may include the energy charging/discharging unit 1410 and the switching unit 1430.

The energy charging/discharging unit 1410 may be configured to be applied with the first driving voltage (i.e., rectifying voltage $V_{rec}$) in the charging mode to store some of the applied first driving voltage and provide the second driving voltage to the LED driving module 1200 through the switching unit 1430 in the discharging mode. In the exemplary embodiment illustrated in FIG. 3, the energy charging/discharging unit 1410 is implemented as a capacitor C1. However, the energy charging/discharging unit 1410 is not limited to the capacitor, but a device or a circuit having various energy charging/discharging functions that may be used as the energy charging/discharging unit 1410. Further, the energy charging/discharging unit 1410 may further include a reverse current preventing diode $D_{ch1}$ for preventing a current from being introduced into a power stage at the time of the discharging of energy. Hereinafter, for brevity and clarity, the energy charging/discharging unit 1410 implemented using a capacitor $C_1$ will be described.

The capacitance of the capacitor $C_1$ may be determined depending on the kind and number of LED groups to be driven by using the second driving voltage and the length of the compensation section. In the exemplary embodiment illustrated in FIGS. 2, 3, and 6, the capacitor $C_1$ needs to supply the second driving voltage to the third LED group 1303 and the fourth LED group 1304 in the compensation section. Thus, the capacitance of the capacitor $C_1$ needs to be decided so that a minimum voltage value of the capacitor $C_1$ is the $V_{f2}$ during the operation. In this case, the capacitor $C_1$ is charged in the section in which the voltage level of the first driving voltage is equal to or more than the $V_{f2}$ and the capacitor $C_1$ is discharged in the section in which the voltage level of the first driving voltage is below the $V_{f2}$. Based on the same principle, in the exemplary embodiment configured to include the first LED group to the n-th LED group and connect the capacitor to the k-th node, the capacitance of the capacitor needs to be decided so that the minimum voltage value of the capacitor may be $V_{fn}-V_{fk}$. In this case, the capacitor $C_1$ is charged in the section in which the voltage level of the first driving voltage is equal to or more than $V_{fn}-V_{fk}$ and the capacitor $C_1$ is discharged in the section in which the voltage level of the first driving voltage is below $V_{fn}-V_{fk}$.

Figure 5A:
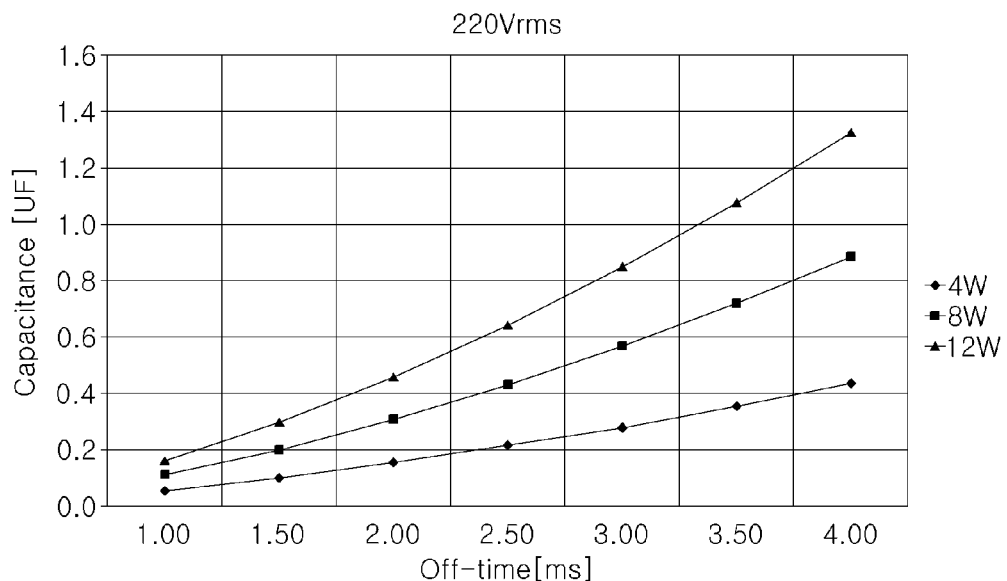
FIGS. 5A and 5B are graphs for describing a capacitance decision of a capacitor according to an exemplary embodiment.
Figure 5B:
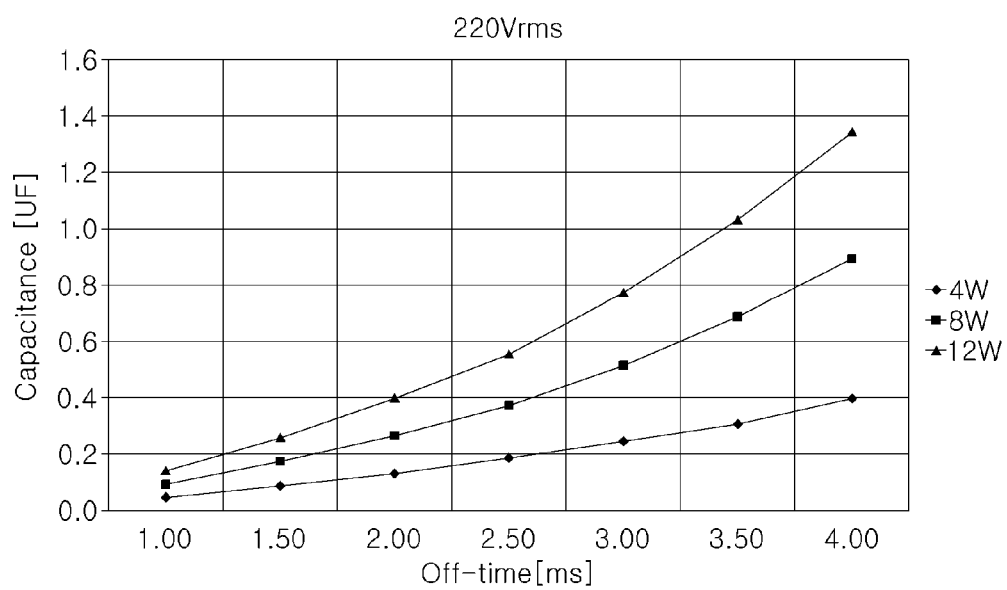

FIGS. 5A and 5B are graphs for describing a capacitance decision of a capacitor according to an exemplary embodiment. The decision of the capacitance of the capacitor $C_1$ for supplying the second driving voltage in the compensation section will be described in more detail with reference to FIGS. 5A and 5B.

Generally, the capacitance of the capacitor $C_1$ may be calculated by a simplified equation like the following Equation 1.

$$C = I\frac{\Delta t}{\Delta v} \qquad \text{(Equation 1)}$$

Equation 1 is a simplified equation which may design the value of the compensation capacitor $C_1$. At the time of the design of the actual product, the values of current I and $\Delta V$ fir the above Equation 1 need to be decided to determine the proper value of the compensation capacitor $C_1$ in consideration of sequential driving current control characteristics. FIG. 5A is a graph illustrating a relationship between an LED off-time (compensation section) and the capacitance of the compensation capacitor $C_1$ at an effective voltage Vrms of 220V considering the current control characteristics. FIG. 5B is a graph illustrating a relationship between the LED off-time (compensation section, $\Delta t$) and the capacitance of the compensation capacitor $C_1$ at the effective voltage Vrms of 120V considering the current control characteristics.

The capacitance represented by the graph is set to be larger than the calculated value in consideration of an error value 10 to 20% of parts at the time of the actual use. $\Delta t$ means the compensation section described with reference to FIG. 4 and I means an effective value Irms of current consumed for the compensation section. $\Delta V$ is a value obtained by subtracting the operating voltage of the LED operated for the compensation section from the maximum value of the rectifying voltage $V_{rec}$ and a ripple voltage of the voltage $V_c$ charged in the compensation capacitor $C_1$ (in the case of the compensation of the first forward voltage level $V_{f1}$, Vcmax$-V_{f1}$ or in the case of the compensation of the second forward voltage level $V_{f2}$, Vcmax$-V_{f2}$).

Referring to FIGS. 5A and 5B, in the case of the compensation of the first forward voltage level $V_{f1}$, the capacitance of the compensation capacitor $C_1$ may be designed to be within a range of a maximum of 2 ms and in the case of the compensation of the second forward voltage level $V_{f2}$, the capacitance of the compensation capacitor $C_1$ may be designed within a range of a maximum of 3 ms. In the case of the sequential driving, an operating time of each stage is decided depending on the magnitude of the input alternating voltage by the operating voltage of the LED. The graphs illustrated in FIGS. 5A and 5B are designed based on an alternating voltage of 60 Hz. Thus, when the frequency of the alternating voltage is changed, the design criteria needs to be changed together. For example, when an alternating voltage of 50 Hz is input, the capacitance of the compensation capacitor $C_1$ needs to be designed to be larger by at least 20% or more in the graphs illustrated in FIGS. 5A and 5B.

The switching unit 1430 is configured to be positioned between the energy charging/discharging unit 1410 and the LED light emitting module 1300 to serve to turn-on/off the electrical connection between the energy charging/discharging unit 1410 and the LED light emitting module 1300 according to the control of the LED driving controller 1210. When the switching unit 1430 is turned-on, the energy charging/discharging unit 1410 enters the discharging mode to provide the second driving voltage to the LED light emitting module 1300. When the switching unit 1430 is turned-off, the energy charging/discharging unit 1410 enters the charging mode to prevent the second driving voltage from being provided to the LED light emitting module 1300. The switching unit 1430 may be implemented using electronic switching devices such as a bipolar junction transistor (BJT) and a field effect transistor (FET) as described above. As illustrated in FIG. 3, the switching unit 1430 may include an electronic switching device $SW_1$ which is selectively turned-on and turned-off depending on a discharging switch control signal CON_SW1 output from the LED driving controller 1210 and a reverse current preventing diode $D_{ch2}$.

In the exemplary embodiment illustrated in FIGS. 2 and 3, the switching unit 1430 is connected to the second node node 2, which is positioned between the cathode terminal of the second LED group 1302 and the anode terminal of the third LED group 1303. As described above, the switching unit 1430 may be changed to a particular node depending on the configuration of the exemplary embodiment. In other words, in the exemplary embodiment configured to include the first to n-th LED groups, it is to be noted that the switching unit 1430 may be connected to any one of the first to k-th nodes depending on the purpose (which LED group(s) the second driving voltage is provided to).

More preferably, the second driving voltage providing module 1400 may further include the charging current controller 1420 to constantly keep the charging current input to the capacitor $C_1$ to be a preset value. Generally, an excessive current is input to the capacitor $C_1$ due to the device characteristics of the capacitor at the timing when the capacitor $C_1$ starts to be charged and thus the damage and the harmonic noise of the capacitor $C_1$ may occur. Therefore, to solve the problems, the second driving voltage providing module 1400 may be configured to include the charging current controller 1420. The charging current controller 1420 is a kind of constant current control circuit. As illustrated in FIG. 3, the charging current controller 1420 be configured to include a switching device $Q_1$ performing a current control function and a constant current control circuit measuring the current value flowing in the capacitor $C_1$ and controlling the switching device $Q_1$ depending on the measured current value to keep a current flowing in the capacitor $C_1$ to be a constant current. As illustrated in FIG. 3, the constant current control circuit may be configured to include a sensing resistor Rs for sensing the current value flowing in the capacitor $C_1$ and the first differential amplifier OP1 comparing the sensed current value with the reference current $I_{ref}$ to control the switching device $Q_1$ so as to control the charging current.

Second Embodiment of Second Driving Voltage Providing Module

Figure 8:
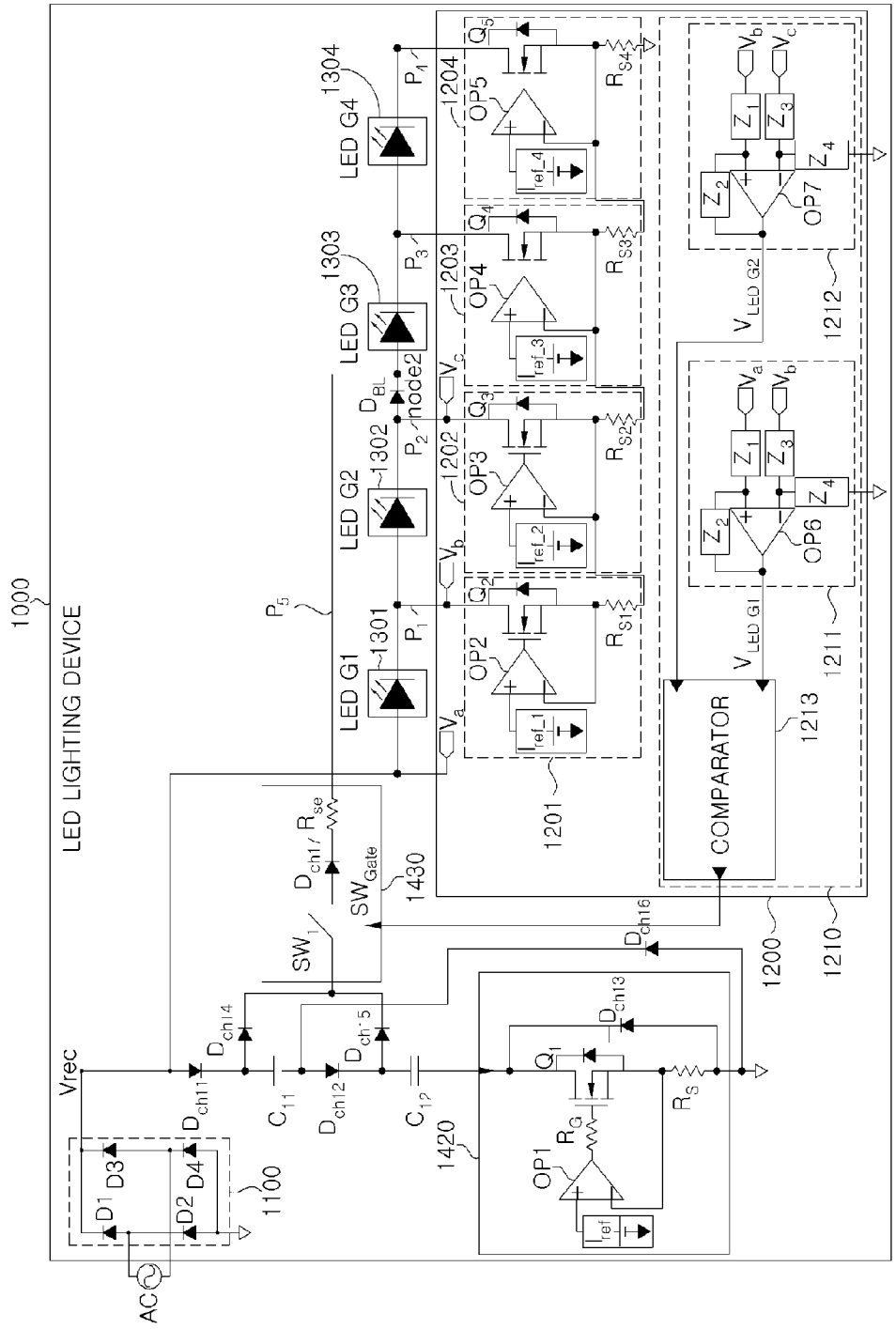
FIG. 8 is a circuit diagram of an LED lighting device including a second driving voltage providing module according to a second embodiment of the present invention.

FIG. 8 is a circuit diagram of an LED lighting device including a second driving voltage providing module according to a second exemplary embodiment. The second driving voltage providing module 1400 according to the second exemplary embodiment will be described in detail with reference to FIG. 8. The biggest difference between the first exemplary embodiment of the second driving voltage providing module 1400 illustrated in FIG. 3 and the second exemplary embodiment of the second driving voltage providing module 1400 illustrated in FIG. 8 is that in the case of the first exemplary embodiment, the energy charging/discharging unit 1410 is configured of one capacitor $C_1$ to be charged/discharged in series. In the second exemplary embodiment, the energy charging/discharging unit 1410 is configured of two capacitors $C_{11}$ and a capacitor $C_{12}$ to be charged in series and discharged in parallel.

In this manner, with the energy charging/discharging unit 1410 configured according to the second exemplary embodiment, it is possible to more improve the efficiency of the second driving voltage providing module 1400 more than the first exemplary embodiment. In the case of the first exemplary embodiment, the voltage across the switching device $Q_1$ of the charging current controller 1420 becomes '$V_{sw}=V_{rec}$ (input voltage)$-V_c$ (charging voltage of capacitor)' (In this equation, Vsw is a minimum DC 20V or more). Thus, a switch loss of the charging current controller 1420 becomes '$P_{sw}=V_{sw}*I_c$ (charging current)*dt (charging time)'. On the other hand, in the case of the second exemplary embodiment, the voltage across the switching device $Q_1$ of the charging current controller 1420 becomes 'Vsw'=$V_{rec}$ (input voltage)$-$[Vc1 (charging voltage of capacitor $C_{11}$)+Vc2 (charging voltage of capacitor $C_{12}$)]'. Here, the maximum charging voltage of Vc1 and Vc2 is Vs/2 (Vs is a maximum charging voltage of the capacitor $C_1$ of the first embodiment) and in the actual implementation, the minimum voltage (DC 20V) required to drive the charging current controller 1420 needs to be considered. In other words, the Vc1 and the Vc2 each have the maximum charging voltage of ($V_{rec}$–20 V)/2. Therefore, according to the second exemplary embodiment, the switch loss of the charging current controller 1420 becomes 'Psw'=Vsw'*$I_c$ (charging current)*dt (charging time)'. In the case of performing the charging using the same charging current, the charging time of the energy charging/discharging unit 1410 according to the second exemplary embodiment is shorter than that of the energy charging/discharging unit 1410 according to the first exemplary embodiment. Further, when the energy charging/discharging unit 1410 is configured to perform the charging for the same time, the charging current $I_c$ required to charge the energy charging/discharging unit 1410 according to the second exemplary embodiment is smaller than that required to charge the energy charging/discharging unit 1410 according to the first exemplary embodiment. Therefore, the second driving voltage providing module 1400 according to the second exemplary embodiment saves the consumed electric energy more than the second driving voltage providing module 1400 according to the first exemplary embodiment, thereby improving the efficiency.

As illustrated in FIG. 8, the energy charging/discharging unit 1410 according to the second exemplary embodiment includes a first capacitor $C_{11}$ and a second capacitor $C_{12}$ connected to the first capacitor $C_{11}$ in series which are charged by being applied with the rectifying voltage $V_{rec}$ in the charging mode and are discharged in the discharging mode to provide the second driving voltage. Further, the energy charging/discharging unit 1410 according to the second exemplary embodiment is configured to further include a reverse current preventing diode $D_{ch11}$ for preventing a discharging current output from the first capacitor $C_{11}$ in the discharging mode from flowing in a power stage, a reverse current preventing diode $D_{ch12}$ for preventing the discharging current output from the second capacitor $C_{12}$ in the discharging mode from flowing in the first capacitor $C_{11}$, a reverse current preventing diode $D_{ch4}$ positioned between the first capacitor $C_{11}$ and the switching unit 1430 to prevent a reverse current, and a reverse current preventing diode $D_{ch5}$ positioned between the second capacitor $C_{12}$ and the switching unit 1430 to prevent a reverse current.

Further, the charging current controller 1420 according to the second exemplary embodiment includes the switching device $Q_1$ performing the current control function and a constant current control circuit measuring the current value flowing in the first capacitor $C_{11}$ and the second capacitor $C_{12}$. The charging current controller 1429 may control the switching device $Q_1$ depending on the measured current value to keep the charging current $I_c$ flowing in the first capacitor $C_{11}$ and the second capacitor $C_1$ to be a constant current. The LED Lighting device 1000 according to the second exemplary embodiment further includes a reverse current preventing diode $D_{ch16}$ positioned between the constant current control circuit and the first capacitor $C_{11}$ and a reverse current preventing diode $D_{ch13}$ positioned between the constant current control circuit and the second capacitor $C_{12}$. Further, as illustrated in FIG. 8, the constant current control circuit may be configured to include the sensing resistor $R_s$ for sensing the current value flowing in the first capacitor $C_{11}$ and the second capacitor $C_1$ and the first differential amplifier OP1 comparing the sensed current value with the reference current $I_{ref}$ to control the switching device $Q_1$ so as to control the charging current.

As described above, if it is determined that the first capacitor $C_{11}$ and the second capacitor $C_{12}$ enter the charging section by the LED driving controller 1210, the switching unit 1430 is turned-off and the first capacitor $C_{11}$ and the second capacitor $C_{12}$ are connected in series and thus are charged by being applied with the rectifying voltage $V_{rec}$. Further, if it is determined that the first capacitor $C_{11}$ and the second capacitor $C_{12}$ enter the discharging section by the LED driving controller 1210, the switching unit 1430 is turned-on and the first capacitor $C_{11}$ and the second capacitor $C_{12}$ discharge the discharging current $I_{dis}$ in parallel to provide the second driving voltage to the LED light emitting module 1300.

FIG. 8 illustrates that the second driving voltage providing module 1400 may be connected to the second node node 2 between the second LED group 1302 and the third LED group 1303. However, the second exemplary embodiment is not limited to such a configuration. Rather, the technical features of the second driving voltage providing module 1400 may minimize the power consumption of the charging current controller 1420 to improve the efficiency. Thus, the technical features may be considered as belonging to the scope of the any exemplary embodiment as long as they include the gist of the second driving voltage providing module 1400 independent of the position to which the second driving voltage providing module 1400.

Example of LED Driving Control of LED Lighting Device

Hereinafter, an operation process of the LED lighting device will be described with reference to FIG. 7. In the exemplary embodiment illustrated in FIG. 7, the second driving voltage is supplied to the third LED group 1303 and the fourth LED group 1304 in the compensation section by compensating for the second forward voltage level V. When the voltage of the first LED group 1301 is a voltage level at which the first LED group 1301 may be normally driven in the compensation section of the second forward voltage level $V_{f2}$, the first LED group 1301 is driven together.

Figure 9:
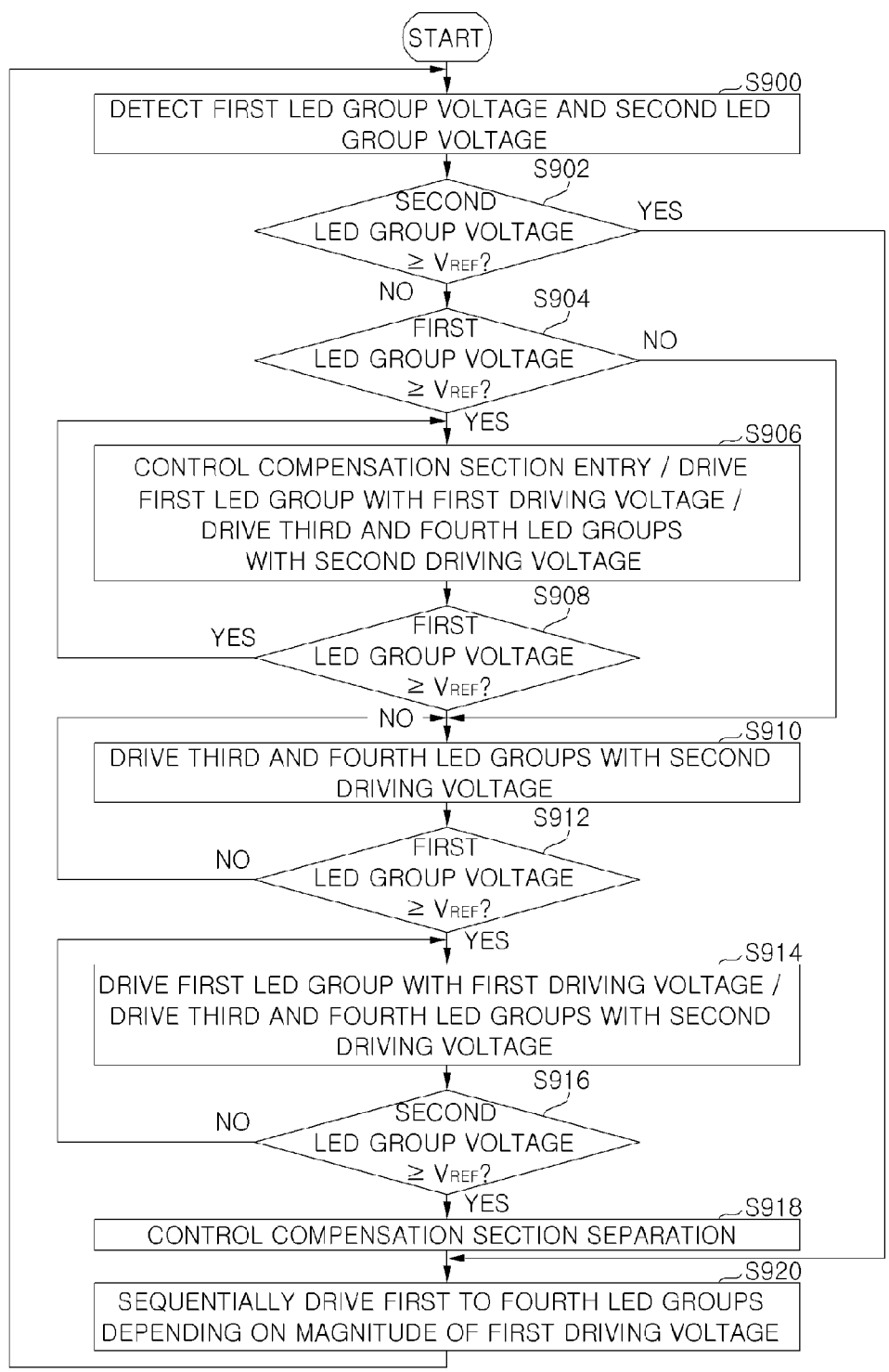
FIG. 9 is a flow chart illustrating an operation process of an LED lighting device according to an embodiment of the present invention.

The following Table 1 is a table showing operating states of the first to fourth LED groups 1301 to 1304 and the switching unit 1430 with the change in the first LED group voltage $V_{LED\ G1}$ and the second LED group voltage $V_{LED\ G2}$ for one period of the rectifying voltage $V_{rec}$, in connection with the embodiment illustrated in FIG. 9. Hereinafter, an operation process of the LED lighting device 1000 in detail with reference to FIG. 7 and Table 1.

TABLE 1

| $V_{LED\ G1}$ | $V_{LED\ G2}$ | $V_{rec}$ | LED G1 | LED G2 | LED G3 | LED G4 | Switching unit |
|---|---|---|---|---|---|---|---|
| Below 65 V | Below 65 V | $0 \le V_{rec} < V_{f1}$ | OFF | OFF | ON | ON | ON |
| 65 V | Below 65 V | $V_{f1} \le V_{rec} < V_{f2}$ | ON | OFF | ON | ON | ON |
| 65 V | 65 V | $V_{f2} \le V_{rec} < V_{f3}$ | ON | ON | OFF | OFF | OFF |
| 65 V | 65 V | $V_{f3} \le V_{rec} < V_{f4}$ | ON | ON | ON | OFF | OFF |
| 65 V | 65 V | $V_{f4} \le V_{rec}$ | ON | ON | ON | ON | OFF |
| 65 V | 65 V | $V_{f3} \le V_{rec} < V_{f4}$ | ON | ON | ON | OFF | OFF |
| 65 V | 65 V | $V_{f2} \le V_{rec} < V_{f3}$ | ON | ON | OFF | OFF | OFF |
| 65 V | Below 65 V | $V_{f1} \le V_{rec} < V_{f2}$ | ON | OFF | ON | ON | ON |
| Below 65 V | Below 65 V | $0 \le V_{rec} < V_{f1}$ | OFF | OFF | ON | ON | ON |

First, the LED driving controller 1210 may continuously detect the first LED group voltage level $V_{LED\ G1}$ and the second LED group voltage level $V_{LED\ G2}$ and compare each of the detected first LED group voltage level $V_{LED\ G1}$ and the detected second LED group voltage level $V_{LED\ G2}$ with the reference voltage $V_{ref}$ (for example, 65V) to monitor the operating state of the first LED group 1301 and the second LED group 1302. The LED driving controller 1210 according to the exemplary embodiment illustrated in FIG. 7 is configured to compensate for the second forward voltage level $V_{f2}$. When the second LED group voltage level $V_{LED\ G2}$ is below the reference voltage (i.e., when the second LED group 1302 is not normally operated), the LED driving controller 1210 determines the entry into the compensation section and when the second LED group voltage level $V_{LED\ G2}$ is the reference voltage (i.e., when the second LED group 1302 is normally operated), determines the separation from the compensation section.

As illustrated in the above Table 1, both of the first LED group voltage level $V_{LED\ G1}$ and the second LED group voltage level $V_{LED\ G2}$ are below 65V at the timing $t_0$ at which a period of the waveform graphs (a) to (c) of FIG. 7 starts and all the second LED groups are not normally operated. Therefore the LED driving controller 1210 determines one continuously in the compensation section entered before the timing t0 illustrated in FIG. 7. The LED driving controller 1210 keeps the output of the discharging switch control signal CON_SW1 output to the switching unit 1430. Therefore, the switching unit 1430 is continuously kept in a turn-on state as it receives the discharging switch control signal CON_SW1 and the second driving voltage supplied from the second driving voltage providing module 1400 is continuously applied to the third LED group 1303 and the fourth LED group 1304, succeeding to the compensation section of the previous period. Further, the discharging current $I_{dis}$ output from the second driving voltage providing module 1400 needs to flow through the fifth current path P5, the third LED group 1303, the fourth LED group 1304, and the fourth current path P4. Therefore the LED driving controller 1210 continuously applies the fourth driving control signal to the fourth LED group driver 1224 to keep the connection state of the fourth current path P4 and performs the constant current control to keep the LED driving current $I_{LED}$ to be the fourth reference current $I_{ref\_4}$. Therefore, as illustrated in waveform graph (a) of FIG. 7, in the compensation section $t_0$ to $t_1$, the third LED group 1303 and the fourth LED group 1304 emit light by the second driving voltage. Waveform graph (c) of FIG. 7 illustrates the discharging switch control signal CON_SW1 output from the LED driving controller 1210 and the discharging current $I_{dis}$ discharged from the second driving voltage providing module 1400, in the compensation section $t_0$ to $t_1$.

The voltage level of the rectifying voltage $V_{rec}$ rises over time, such that when the first LED group voltage level $V_{LED\_G1}$ reaches 65V (timing t1), the LED driving controller 1210 continuously compensates for the second forward voltage level $V_{f2}$ and performs a control to apply the first driving control signal to the first LED group driver 1221 to drive the first LED group 1301 using the rectifying voltage $V_{rec}$, to thereby connect the first current path P1 and make the first LED driving current $I_{LED1}$ flow in the first LED group 1301. In the time section $t_1$ to $t_2$ in which the first LED group voltage level $V_{LED\_G1}$ is 65 V and the second LED group voltage level $V_{LED\_G2}$ is below 65 V, the first LED group 1301 is driven by the first driving voltage through the first current path P1 and the third LED group 1303 and the fourth LED group 1304 are driven by the second driving voltage through the fourth current path P4. In other words, both of the first current path P1 and the fourth current path P4 are connected to the LED driving controller 1210, such that as illustrated in waveform graph (a) of FIG., the first LED group 1301, the third LED group 1303, and the fourth LED group 1304 emit light in the compensation section $t_1$ to $t_2$. Waveform graph (c) of FIG. 7 illustrates the discharging switch control signal CON_SW1 output from the LED driving controller 1210 and the discharging current $I_{dis}$ discharged from the second driving voltage providing module 1400, in the compensation section $t_1$ to $t_2$.

The voltage level of the rectifying voltage Vrec again rises over time, such that when the second LED group voltage level $V_{LED\_G2}$ reaches 65V (timing t2), the second LED group 1302 may be normally operated. Therefore, the LED driving controller 1210 determines the separation from the compensation section and starts to perform the LED driving control in the non-compensation section simultaneously with performing the control to separate the compensation section. Therefore, the LED driving controller 1210 stops outputting the discharging switch control signal CON_SW1 which is output to the switching unit 1430 to turn-off the discharging switch SW1 and disconnects between the second driving voltage providing module 1400 and the second node node2. Further, to perform the LED driving control in the non-compensation section t2 to t3, the LED driving controller 1210 turns-off the first LED group driver 1221 to release the connection of the first current path P1 so that the second current path P2 may be formed from the first driving voltage input stage to the LED driving controller 1210 through the first LED group 1301 and the second LED group 1302 and applies the second driving control signal to the second LED group driver 1222 to turn-on the second LED group driver 1222 to connect the second current path P2. In this case, the second LED driving current ILED2 flowing through the first LED group 1301 and the second LED group 1302 is constant-current-controlled with the second reference current $I_{ref\_2}$ by the second LED group driver 1222.

Therefore, as illustrated in waveform graph (a) of FIG. 7, in the non-compensation section $t_2$ to $t_3$, the first LED group 1301 and the second LED group 1302 emit light by the first driving voltage. Referring to waveform graph (c) of FIG. 7, the output of the discharging switch control signal CON_SW1 stops at the timing $t_2$, such that it may be appreciated that the discharging current Idis from the second driving voltage providing module 1400 is no more output. Further, in waveform graph (c) of FIG. 7, the charging current $I_c$ is generated at a predetermined timing (timing when the voltage level of the rectifying voltage $V_{rec}$ exceeds the current voltage level of the energy charging/discharging unit 1410) which passes through the timing $t_2$ and thus the energy charging/discharging unit 1410 starts to be charged. Meanwhile, in FIG. 7, the LED driving controller 1210 determines the separation from the compensation section at the timing $t_2$ and therefore the following processes depend on the LED driving control scheme in the non-compensation section. Therefore, the LED driving controller 1210 determines the magnitude of the input rectifying voltage $V_{rec}$ and thus sequentially drives the first to fourth LED groups 1301 to 1304.

The magnitude of the rectifying voltage $V_{rec}$ is increased and thus at the timing t3 when the magnitude of the rectifying voltage $V_{rec}$ is the third forward voltage level Vf3, the LED driving controller 1210 turns-off the second LED group driver 1222 and starts to apply the third driving control signal to the third LED group driver 1203. As the third LED group driver 1223 is driven, the third current path P3 is connected and thus the third LED driving current $I_{LED3}$ which is constant-current-controlled with the preset reference current $I_{ref\_3}$ therethrough flows, such that the first LED group 1301, the second LED group 1302, and the third LED group 1303 emit light.

Further, the magnitude of the rectifying voltage $V_{rec}$ is increased and thus at the timing $t_4$ when the magnitude of the rectifying voltage $V_{rec}$ is the fourth forward voltage level $V_{f4}$, the LED driving controller 1210 turns-off the third LED group driver 1223 and starts to apply the fourth driving control signal to the fourth LED group driver 1224. As the fourth LED group driver 1224 is driven, the fourth LED driving current $I_{LED4}$ which is constant-current-controlled with the preset reference current IREF4 through the fourth current path P4 flows, such that all of the first LED group 1301 to the fourth LED group 1304 emit light.

In the case in which the rectifying voltage $V_{rec}$ reaches a maximum voltage and then is reduced over time, the control is also performed like the foregoing scheme. The magnitude of the rectifying voltage $V_{rec}$ is reduced over time and thus at the timing t5 when the magnitude of the rectifying voltage $V_{rec}$ is below the fourth forward voltage level $V_{f4}$, the LED driving controller 1210 turns-off the fourth LED group driver 1224 and starts to apply the third driving control signal to the third LED group driver 1223. As the fourth LED group driver 1224 is turned-off and the third LED group driver 1223 is driven, the third LED driving current ILED3 which is constant-current-controlled with the preset reference current $I_{ref\_3}$ through the third current path P3 flows, such that the first LED group 1301 to the third LED group 1303 emit light. Similarly, at the timing $t_6$ when the magnitude of the rectifying voltage $V_{rec}$ is the third forward voltage level $V_{f3}$, the LED driving controller 1210 turns-off the third LED group driver 1223 and starts to apply the second driving control signal to the second LED group driver 1222. As the third LED group driver 1223 is turned-off and the second LED group driver 1222 is driven, the second LED driving current $I_{LED2}$ which is constant-currentcontrolled with the preset reference current $I_{ref\_2}$ through the second current path P2 flows, such that the first LED group 201 and the second LED group 202 emit light.

At the timing $t_7$ when the magnitude of the rectifying voltage $V_{rec}$ is below the second forward voltage level $V_{f2}$ over time the second LED group voltage level $V_{LED\ G2}$ is below 65V again. Therefore, the LED driving controller 1210 determines the entry into the compensation section of the second forward voltage level $V_{f2}$ and performs a control depending on the entry into the compensation section. The LED driving controller 1210 outputs the discharging switch control signal CON_SW1 to the switching unit 1430 to turn-on the switching unit 1430. Thus, the switching unit 1430 is turned-on to connect the second driving voltage providing module 1400 to the second node node2 and the second driving voltage from the second driving voltage providing module 1400 is provided to the third LED group 1303 and the fourth LED group 1304. Further, the discharging current $I_{dis}$ output from the second driving voltage providing module 1400 needs to flow through the fifth current path P5, the third LED group 1303, the fourth LED group 1304, and the fourth current path P4, and therefore the LED driving controller 1210 applies the fourth driving control signal to the fourth LED group driver 1224 to form the fourth current path P4 and performs the constant current control to keep the fourth LED driving current $I_{LED4}$ to be the fourth reference current $I_{ref\_4}$. Simultaneously, the voltage level of the first driving voltage is the voltage level at which the first LED group 1301 may be driven, and therefore as described above, in the compensation section $t_7$ to $t_8$, to drive the first LED group 1301 using the first driving voltage, the LED driving controller 1210 turns-off the second LED group driver 1222 and outputs the first driving control signal to the first LED group driver 1221 to turn-on the first LED group driver 1221. As the first LED group driver 1221 is turned-on, the first current path P1 is connected and the first LED group driver 1221 performs a constant current control to keep the first LED driving current ILED1 flowing through the first current path P1 to be the first reference current $I_{ref\_1}$. Therefore, as illustrated in waveform graph (a) of FIG. 7, in the time section $t_7$ to $t_8$ in which the first LED group voltage level VLED G1 is 65 V and the second LED group voltage level $V_{LED\ G2}$ is below 65 V, the first LED group 1301 is driven by the first driving voltage through the first current path P1 and the third LED group 1303 and the fourth LED group 1304 are driven by the second driving voltage through the fourth current path P4. Waveform graph (c) of FIG. 7 illustrates the discharging switch control signal CON_SW1 output from the LED driving controller 1210 and the discharging current $I_{dis}$ discharged from the second driving voltage providing module 1400, in the compensation section $t_7$ to $t_8$.

The voltage level of the rectifying voltage $V_{rec}$ falls over time, such that when the first LED group voltage level $V_{LED\ G1}$ is below 65V (timing $t_8$), the LED driving controller 1210 stops driving the first LED group 1301 and continuously drives the third LED group 1303 and the fourth LED group 1304 by the second driving voltage. In this case, the LED driving controller 1210 may turn-off the first LED group driver 1221 to release the connection of the first current path P1 or may not perform a separate control to stop driving the first LED group 1301 (at this timing, the first LED group 1301 does not emit light independent of the connection of the first current path P1). Therefore, as illustrated in waveform graph (a) of FIG. 7, in the compensation section t8 to t9, the third LED group 1303 and the fourth LED group 1304 are driven by the second driving voltage. Waveform graph (c) of FIG. 7 illustrates the discharging switch control signal CON_SW1 output from the LED driving controller 1210 and the discharging current $I_{dis}$ discharged from the second driving voltage providing module 1400, in the compensation section $t_7$ to $t_8$.

Meanwhile, reviewing the relationship among the charging current Ic, the discharging current $I_{dis}$, and the discharging switch control signal CON_SW1 of the energy charging/discharging unit 1410 with reference to waveform graphs (b) and (c) of FIG. 7, the discharging switch control signal CON_SW1 is input to the switching unit 1430 in the compensation sections $t_0$ to $t_2$ and $t_7$ to $t_9$, such that it may be appreciated that the discharging current $I_{dis}$ is supplied to the third LED group 1303 and the fourth LED group 1304. The discharging switch control signal CON_SW1 is not input to the switching unit 1430 in the non-compensation section $t_2$ to $t_7$, such that it may be appreciated that the discharging from the second driving voltage providing module 1400 is not generated and thus the discharging current is not generated and the charging current $I_c$ is generated at the predetermined timing when the magnitude of the rectifying voltage $V_{rec}$ is equal to or more than a minimum voltage level of the energy charging/discharging unit 1410 and thus the energy charging/discharging unit 1410 is charged.

Further, reviewing the optical output waveform of the LED light emitting module 1300 illustrated in waveform graph (a) of FIG. 7, it may be confirmed that the optical output of the LED light emitting module 1300 is compensated by the energy charging/discharging unit 1410 in the section represented by a diagonal line (i.e., compensation section t0 to t2 and compensation section $t_7$ to $t_9$).

Example of Driving Process of LED Lighting Device

FIG. 9 is a flow chart illustrating an operation process of an LED lighting device according to an exemplary embodiment. The exemplary embodiment illustrated in FIG. 9 is configured to include the first to fourth LED groups 1301 to 1304, compensates for the second forward voltage level $V_{f2}$ to supply the second driving voltage to the third LED group 1303 and the fourth LED group 1304 through the second node node 2 in the compensation section, and drives the first LED group 1301 together when the voltage of the first LED group 1301 is the voltage level at which the first LED group 1301 may be normally driven in the compensation section of the second forward voltage level $V_{f2}$. Hereinafter, the operation process of the LED lighting device according to an exemplary embodiment will be described in detail with reference to FIG. 9.

When the alternating voltage starts to be applied to the LED lighting device 1000, the LED driving controller 1210 continuously detects the first LED group voltage level VLED G1 and the second LED group voltage level $V_{LED\ G2}$ (S900). The detection of the first LED group voltage level $V_{LED\ G1}$ and the second LED group voltage level $V_{LED\ G2}$ is continuously performed while the LED lighting device 1000 is operated.

The LED driving controller 1210 compares the detected second LED group voltage level $V_{LED\ G2}$ with the set reference voltage $V_{ref}$ (i.e., 65V) to determine whether the second LED group 1302 is normally operated (S902). The exemplary embodiment described with reference to FIG. 9 is configured to compensate for the second forward voltage level $V_{f2}$. Thus, when the second LED group voltage level $V_{LED\ G2}$ is below the set reference voltage $V_{ref}$, the LED driving controller 1210 determines the entry into the compensation section and outputs the discharging switch control signal CON_SW1 to the switching unit 1430 to turn-on the discharging switch SW1, such that the second driving voltage providing module 1400 is connected to the second node node 2 to supply the second driving voltage to the third LED group 1303 and the fourth LED group 1304 (S906). In this case, the fourth current path P4 is connected through the fourth LED group driver 1204 and the fourth LED driving current $I_{LED4}$ drives the third LED group 1303 and the fourth LED group 1304.

The first LED group voltage level $V_{LED\ G1}$ may compared with the set reference voltage $V_{ref}$ (S904), and as the comparison result, if it is determined that the first LED group 1301 is normally operated (i.e., $V_{LED\ G1}$ is 65V), the LED driving controller 1210 connects the first current path P1 together to drive the first LED group 1301 and thus the first LED group 1301 may be driven together by the first driving voltage (rectifying voltage $V_{rec}$) (S906). In this case, the first LED group 1301 is driven by the first LED driving current $I_{LED1}$ which is constant-current-controlled by the first LED group driver 1221. Therefore, at this timing, the connection state of the first current path P1 and the connection state of the fourth current path P4 are kept simultaneously and the first LED group 1301 is driven by the first driving voltage and the third LED group 1303 and the fourth LED group 1304 are driven by the second driving voltage.

The LED driving controller 1210 continuously compares the first LED group voltage level $V_{LED\ G1}$ with the reference voltage (S908). When the voltage level of the rectifying voltage $V_{rec}$ falls over time, the first LED group voltage level $V_{LED\ G1}$ may fall below the reference voltage, the LED driving controller 1210 may stop driving the first LED group 1301 and continues to drive the third LED group 1303 and the fourth LED group 1304 by the second driving voltage (S910). In this case, the LED driving controller 1210 may release the connection of the first current path P1 or may not perform a separate control to stop driving the first LED group 1301 (at this timing, the first LED group 1301 does not emit light independent of the connection of the first current path P1).

When the voltage level of the rectifying voltage $V_{rec}$ rises over time and the first LED group voltage level $V_{LED\ G1}$ is the reference voltage, the LED driving controller 1210 may drive the first LED group 1301 using the first driving voltage (S912 and S914). In the foregoing operation S910, when the connection of the first current path P1 is released, the LED driving controller 1210 controls the first LED group driver 1221 to connect the first current path P1, such that the first LED group 1301 may be driven by the first driving voltage. On the other hand, in the foregoing operation S910, when the connection of the first current path P1 is kept, the LED driving controller 1210 does not perform a separate control. In this case, the third LED group 1303 and the fourth LED group 1304 are in the state in which they are continuously driven by the second driving voltage.

When the voltage level of the rectifying voltage $V_{rec}$ rises over time, both of the first LED group voltage level $V_{LED\ G1}$ and the second LED group voltage level $V_{LED\ G2}$ reach the reference voltage, the LED driving controller 1210 determines the separation from the compensation section to perform the control of the separation from the compensation section (S916 and S918). Therefore, the LED driving controller 1210 stops outputting the discharging switch control signal CON_SW1 which is output to the switching unit 1430, such that the discharging switch SW1 is turned-off and the connection between the second driving voltage providing module 1400 and the second node node2 is released. Further, the LED driving controller 1210 turns-off the first LED group driver 1221 and turns-on the second LED group driver 1222 to connect the second current path P2.

Due to the entry into the non-compensation section, the LED driving controller 1210 sequentially drives the LED groups depending on the voltage level of the input rectifying voltage $V_{rec}$ according to the driving control scheme in the non-compensation section as described above (S920), and the operations S902 to 904 are performed simultaneously. Further, the charging current $I_c$ is input to the energy charging/discharging unit 1410 within the second driving voltage providing module 1400 in the non-compensation section and thus the energy charging/discharging unit 1410 is charged. As described above, the charging current $I_c$ at the time of the charging may be constant-current-controlled with the preset value by the charging current controller 1420.

What is claimed is:

1. A light-emitting diode (LED) driving circuit comprising:
an LED driving module configured to:
provide a first driving voltage to an LED light emitting module comprising a first LED group to an n-th LED group, wherein n being an integer which is equal to or larger than 2, and
sequentially drive the first LED group to the n-th LED group depending on a voltage level of the first driving voltage; and
a second driving voltage providing module configured to:
store some of the first driving voltage; and
selectively provide a second driving voltage to some LED groups other than at least the first LED group to an m-th LED group among the LED groups in a ($V_{fm}$) compensation section, wherein 1≤m≤n−1, according to a control of the LED driving module,
wherein the LED driving module is configured to:
detect an operating state of the m-th LED group and when the m-th LED group is not normally operated, determine that the m-th LED group enters the ($V_{fm}$) compensation section, and
further determine that the m-th LED group is separated from the ($V_{fm}$) compensation section when the m-th LED group is normally operated again, and
wherein the first driving voltage has a voltage value that changes over time with a minimum voltage value that is less than or equal to ($V_{f1}$) and a maximum voltage value that is greater than or equal to ($V_{fn}$).

2. The LED driving circuit of claim 1, wherein:
the first driving voltage is a full-wave-rectified alternating voltage;
the LED light emitting module comprises a k-th node between a cathode terminal of a k-th LED group and an anode terminal of a k+1-th LED group, wherein 1≤k≤n−1, and wherein m≤k; and
the second driving voltage providing module is configured to include an energy charging/discharging unit connected to the k-th node to selectively provide the second driving voltage to the k+1-th LED group to the n-th LED group other than the first LED group to the k-th LED group among the LED groups in the ($V_{fm}$) compensation section.

3. The LED driving circuit of claim 2, wherein the LED driving module is configured to detect a voltage across the m-th LED group and compare the detected voltage of the m-th LED group with a preset reference voltage to determine the operating state of the m-th LED group.

4. The LED driving circuit of claim 2, wherein the LED driving module is configured to detect a driving current of the m-th LED group and compare the detected driving current with a preset reference current to determine the operating state of the m-th LED group.

5. The LED driving circuit of claim 2, wherein the LED driving module is configured to control the first LED group to the m-th LED group so as not to drive the first LED group to the m-th LED group in the ($V_{fm}$) compensation section when the ($V_{fm}$) is equal to or greater than ($V_{f2}$).

6. The LED driving circuit of claim 2, wherein the LED driving module is configured to control the first LED group to the m-th LED group so as to sequentially drive the first LED group to the m-th LED group depending on the voltage level of the first driving voltage applied to the first LED group to the m-th LED group in the ($V_{fm}$) compensation section, when the ($V_{fm}$) is equal to or greater than ($V_{f2}$).

7. The LED driving circuit of claim 2, wherein the LED light emitting module further comprises a current cut-off unit configured to be disposed between the k-th node and a cathode of the k-th LED group to cut-off a current by the second driving voltage from being input to the k-th LED group.

8. The LED driving circuit of claim 2, wherein the second driving voltage providing module is connected to a second node of the LED light emitting module and is configured to selectively provide the second driving voltage to a third LED group to the n-th LED group other than the first LED group and a second LED group among the LED groups in a ($V_{f2}$) compensation section.

9. The LED driving circuit of claim 8, wherein the LED driving module is configured to drive the first LED group with the first driving voltage depending on the voltage level of the first driving voltage in the ($V_{f2}$) compensation section and drive at least one of the third LED group to the n-th LED group using the second driving voltage.

10. The LED driving circuit of claim 2, wherein the second driving voltage providing module is connected to a second node of the LED light emitting module and configured to selectively provide the second driving voltage to the third LED group to the n-th LED group other than the first LED group and the second LED group among the LED groups in a ($V_{f1}$) compensation section.

11. The LED driving circuit of claim 1, wherein the second driving voltage providing module further comprises a charging current controller configured to limit a charging current input to the second driving voltage providing module to a preset constant current value when storing some of the first driving voltage.

12. The LED driving circuit of claim 2, wherein:
the second driving voltage providing module further comprises a switching unit configured to control an electrical connection between the energy charging/discharging unit and the k-th node; and
the energy charging/discharging unit is configured to enter a charging mode to be charged with the first driving voltage when the switching unit is in a turn-off state and enter a discharging mode to be discharged when the switching unit is in a turn-on state to provide the second driving voltage to the LED light emitting module.

13. A method of driving a light-emitting diode (LED) lighting device sequentially driving an LED light emitting module comprising a first LED group to an n-th LED group, wherein n being an integer which is equal to or greater than 2, using a first driving voltage of which a voltage value is changed over time, the driving method comprising:
detecting an operating state of an m-th LED group, wherein $1 \leq m \leq n-1$;
sequentially driving the first LED group to the n-th LED group depending on a voltage level of the first driving voltage when the m-th LED group is normally operated and storing some of the first driving voltage in a second driving voltage providing module; and
determining that the m-th LED group is in a ($V_{fm}$) compensation section and selectively providing a second driving voltage output from the second driving voltage providing module to some LED groups other than the first LED group to the m-th LED group among the LED groups, when the m-th LED group is not normally operated.

14. The driving method of claim 13, wherein:
the first driving voltage is a full-wave-rectified alternating voltage;
the LED light emitting module comprises a k-th node between a cathode terminal of a k-th LED group and an anode terminal of a k+1-th LED group, wherein $1 \leq k \leq n-1$, and wherein $m \leq k$; and
the second driving voltage providing module comprises an energy charging/discharging unit connected to the k-th node to selectively provide the second driving voltage to the k+1-th LED group to the n-th LED group other than the first LED group to the k-th LED group among the LED groups in the ($V_{fm}$) compensation section.

* * * * *